(12) United States Patent
Li et al.

(10) Patent No.: US 8,432,099 B2
(45) Date of Patent: Apr. 30, 2013

(54) SYSTEMS AND METHODS FOR CONTROLLING BRIGHTNESS OF COLD-CATHODE FLUORESCENT LAMPS WITH WIDE DIMMING RANGE AND ADJUSTABLE MINIMUM BRIGHTNESS

(75) Inventors: Miao Li, Shanghai (CN); Liqiang Zhu, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 94 days.

(21) Appl. No.: 12/861,137

(22) Filed: Aug. 23, 2010

(65) Prior Publication Data

US 2011/0316428 A1 Dec. 29, 2011

(30) Foreign Application Priority Data

Jun. 24, 2010 (CN) .......................... 2010 1 0217991

(51) Int. Cl.
H05B 37/02 (2006.01)

(52) U.S. Cl.
USPC .......................................... 315/152; 315/291

(58) Field of Classification Search .................. None
See application file for complete search history.

(56) References Cited

U.S. PATENT DOCUMENTS

| | | | | |
|---|---|---|---|---|
| 5,747,942 A | * | 5/1998 | Ranganath | 315/224 |
| 6,469,454 B1 | * | 10/2002 | Mader et al. | 315/291 |
| 7,362,361 B2 | * | 4/2008 | Matsukawa | 348/241 |

* cited by examiner

Primary Examiner — Crystal L Hammond
(74) Attorney, Agent, or Firm — Jones Day

(57) ABSTRACT

System and method for adjusting brightness of one or more cold-cathode fluorescent lamps. The system includes a voltage selector configured to receive a dimming voltage and a first threshold voltage and generate an output voltage. The output voltage is selected from a group consisting of the dimming voltage and the first threshold voltage. Additionally, the system includes an oscillator coupled to a first capacitor and configured to generate a ramp signal with the first capacitor, and a signal generator configured to receive the ramp signal and the output voltage and generate a first signal. The first signal corresponds to a lamp brightness level. Moreover, the system includes a brightness detector configured to receive the first signal and output a second signal. The second signal indicates whether the lamp brightness level is higher than a threshold brightness level.

17 Claims, 15 Drawing Sheets

SYSTEMS AND METHODS FOR CONTROLLING BRIGHTNESS OF COLD-CATHODE FLUORESCENT LAMPS WITH WIDE DIMMING RANGE AND ADJUSTABLE MINIMUM BRIGHTNESS

1. CROSS-REFERENCES TO RELATED APPLICATIONS

This application claims priority to Chinese Patent Application No. 201010217991.0, filed Jun. 24, 2010, commonly assigned, incorporated by reference herein for all purposes.

2. BACKGROUND OF THE INVENTION

The present invention is directed to brightness control. More particularly, the invention provides brightness control systems and methods with wide dimming range and adjustable minimum brightness. Merely by way of example, the invention has been applied to controlling brightness of cold-cathode fluorescent lamps (CCFLs). But it would be recognized that the invention has a much broader range of applicability.

The brightness of cold-cathode fluorescent lamps (CCFLs) can be controlled by conventional burst dimming technology. For burst dimming, a DC voltage is often received by a control chip, which, in response, adjusts the duty cycle of a low-frequency signal within the chip. This low-frequency signal is used to control a gate driver, whose output is further processed to adjust the brightness of the CCFLs. Sometimes, one or more of these CCFLs have an open circuit, so the control chip may also include an open-loop-protection (OLP) component. The OLP component can turn off the output of the gate driver if the control chip determines the current that flows through one or more CCFLs falls below a predetermined threshold level. But if the brightness of a CCFL becomes too low, the control chip may mistakenly infer the CCFL has an open circuit. Hence, the control chip usually sets a fixed minimum brightness internally.

FIG. 1 is a simplified diagram showing a conventional system for controlling brightness of one or more CCFLs. The system 100 includes a control chip 102, a power stage 104, a transformer 106, a CCFL 108, resistors 109 and 114, and capacitors 107, 134 and 154. Additionally, the control chip 102 includes a voltage generator 110, a voltage selector 120, an oscillator 130, a burst generator 140, an error amplifier 150, a gate driver 160, a logic component 170, an open-loop detector 180, and a protection component 190. Moreover, the control chip 102 also includes terminals 112, 122, 132, 152, 162, and 166.

As shown in FIG. 1, through the terminal 112, the voltage generator 110 is coupled to the resistor 114. The oscillator 130 and the burst generator 140 are coupled to the capacitor 134 through the terminal 132. Additionally, the error amplifier 150 is coupled to the CCFL 108 and the resistor 109 through the terminal 152. Moreover, the error amplifier 150 and the gate driver 160 are coupled to the capacitor 154 through the terminal 166. Also, the gate driver 160 is coupled to the power stage 104 through the terminal 162.

As an example, the control chip 102 regulates the start-up, normal operation, and protection of the system 100. Specifically, the control chip 102 sends a drive signal 164 to the power stage 104. The power stage 104 also receives a system input voltage ($V_{IN}$) and generates a transformer input voltage, which is received by the transformer 106. The transformer 106, together with the capacitor 107, supplies a lamp voltage to the CCFL 108. The CCFL 108 is coupled to the resistor 109, which converts the current that flows through the CCFL 108 into a sensing voltage 158. The sensing voltage 158 is then received by the error amplifier 150 through the terminal 152.

As shown in FIG. 1, the error amplifier 150 is a part of the control chip 102, which also includes at least the voltage selector 120. The voltage selector 120 receives a DRC voltage ($V_{DRC}$) and a dimming voltage ($V_{DIM}$). The DRC voltage is a predetermined voltage, and is generated by one or more components internal to the control chip 102. In contrast, the dimming voltage can be adjusted and is supplied through the terminal 122 from one or more components that are external to the control chip 102. The voltage selector 120 compares $V_{DRC}$ and $V_{DIM}$, and uses the lower of the these two voltages as its output voltage $V_{burst}$.

Additionally, the oscillator 130 is a low frequency oscillator. The oscillator 130, together with the capacitor 134, generates a ramp signal 136. The ramp signal 136 is received by the burst generator 140, which also receives the voltage $V_{burst}$. The burst generator 140 compares the voltage $V_{burst}$ and the ramp signal 136, and generates a burst signal 142 (e.g., a pulse-width-modulation burst signal). The burst signal 142 is received by the error amplifier 150. The error amplifier 150 processes the received burst signal 142 and the received sensing voltage 158, and outputs a CMP signal 156 with the capacitor 154. The CMP signal 156 is sent to the gate driver 160.

As shown in FIG. 1, the control chip 102 also includes the logic component 170, the open-loop detector 180, and the protection component 190. The logic component 170 outputs an ENA signal 172 to the open-loop detector 180. The open-loop detector 180 also receives the sensing voltage 158. If enabled by the ENA signal 172, the open-loop detector 180 processes the sensing voltage 158, determines whether the CCFL 108 has an open circuit, and sends an OLP signal 182 to the protection component 190. In response, the protection component 190 outputs a signal 192 to the gate driver 160.

The gate driver 160 then processes the received signals 156 and 192 and sends the drive signal 164 through the terminal 162 to the power stage 104. If the OLP signal 182 indicates that the CCFL 108 has been determined to have an open circuit, the drive signal 164 would remain at the logic low level. Additionally, if the open-loop detector 180 is not enabled by the ENA signal 172, the drive signal 164 is not affected by the signal 192. For example, the drive signal 164 is generated based on the CMP signal 156, not the signal 192, if the ENA signal 172 is at the logic low level. Furthermore, the control chip 102 also includes the voltage generator 110. The voltage generator 110 provides a reference voltage to the resistor 114 through the terminal 112.

FIG. 2 is a simplified diagram showing convention signal curves for the system 100 for controlling brightness of one or more CCFLs. Specifically, a curve 210 represents the ramp signal 136 as a function of time, and a curve 220 represents the dimming voltage as a function of time. Additionally, a curve 230 represents the burst signal 142 as a function of time, and a curve 240 represents the drive signal 164 as a function of time. Moreover, a curve 250 represents a function of lamp current as a function of time. The lamp current is the current that flows through the CCFL 108. Alternatively, the curve 250 represents a function of the sensing voltage 158 as a function of time.

FIG. 3 is a simplified conventional diagram showing duty cycle of the burst signal 142 as a function of the dimming voltage for the system 100 for controlling brightness of one or more CCFLs. As shown in FIG. 3, if the dimming voltage is smaller than a first threshold level ($V_{th1}$) but larger than or equal to zero, the duty cycle of the burst signal 142 remains at 100%.

If the dimming voltage is equal to or larger than the first threshold level ($V_{th1}$) but smaller than or equal to the DRC voltage, the duty cycle of the burst signal 142 decreases with the increasing $V_{DIM}$, along a straight line 310. As discussed above, the DRC voltage is a predetermined voltage that is generated by one or more components internal to the control chip 102. As shown in FIG. 3, if the dimming voltage is equal to the DRC voltage, the duty cycle is equal to a minimum level ($D_{min}$). Additionally, if the dimming voltage is larger than the DRC voltage, the duty cycle remains at the minimum level ($D_{min}$).

Specifically, the DRC voltage is a constant that is larger than the first threshold level ($V_{th1}$) and smaller than a second threshold level ($V_{th2}$). As shown in FIG. 3, the second threshold level ($V_{th2}$) corresponds to the intersection between the horizontal axis for $V_{DIM}$ and the extension of the straight line 310. Correspondingly, the minimum level ($D_{min}$) is a constant that is lower than 100% but higher than zero.

Also, as shown in FIG. 1, the brightness of the CCFL 109 increases with the duty cycle of the burst signal 142. If the duty cycle of the burst signal 142 is at 100%, the brightness of the CCFL 109 is at the maximum. If the duty cycle of the burst signal 142 is at the minimum level ($D_{min}$), the brightness of the CCFL 109 is at the minimum.

In addition to the burst dimming technology as discussed above, the brightness of CCFLs can also be controlled by conventional analog dimming technology. For analog dimming, an external voltage is often received by a control chip, which, in response, converts the received external voltage into an internal DC voltage. For example, the internal DC voltage is used to adjust the lamp current that flows through the CCFLs. In another example, the lamp current is proportional to the internal DC voltage. Hence, the brightness of the CCFLs can be changed by adjusting the internal DC voltage, which is often controlled by the external voltage.

FIG. 4 is a simplified diagram showing another conventional system for controlling brightness of one or more CCFLs. The system 400 includes a control chip 402, a power stage 404, a transformer 406, a CCFL 408, resistors 409 and 414, and capacitors 407 and 454. Additionally, the control chip 402 includes a voltage generator 410, a voltage selector 420, a level shifter 430, an error amplifier 450, a gate driver 460, a logic component 470, an open-loop detector 480, and a protection component 490. Moreover, the control chip 102 also includes terminals 412, 422, 452, 462, and 466.

As shown in FIG. 4, through the terminal 412, the voltage generator 410 is coupled to the resistor 414. Additionally, the error amplifier 450 is coupled to the CCFL 408 and the resistor 409 through the terminal 452. Moreover, the error amplifier 450 and the gate driver 460 are coupled to the capacitor 454 through the terminal 466. Also, the gate driver 460 is coupled to the power stage 404 through the terminal 462.

As an example, the control chip 402 regulates the start-up, normal operation, and protection of the system 400. Specifically, the control chip 402 sends a drive signal 464 to the power stage 404. The power stage 404 also receives a system input voltage ($V_{IN}$) and generates a transformer input voltage, which is received by the transformer 406. The transformer 406, together with the capacitor 407, supplies a lamp voltage to the CCFL 408. The CCFL 408 is coupled to the resistor 409, which converts the current that flows through the CCFL 408 into a sensing voltage 458. The sensing voltage 458 is then received by the error amplifier 450 through the terminal 452.

As shown in FIG. 4, the error amplifier 450 is a part of the control chip 402, which also includes at least the voltage selector 420 and the level shifter 430. The level shifter 430 receives a dimming voltage ($V_{DIM}$) and converts the dimming voltage ($V_{DIM}$) into a shifted voltage ($V_{sft}$). For example, the dimming voltage can be adjusted and is supplied through the terminal 422 from one or more components that are external to the control chip 402. In another example, the shifted voltage is inversely proportional to the dimming voltage.

The shifted voltage ($V_{sft}$) is outputted to the voltage selector 420, which also receives a DRC voltage ($V_{DRC}$). The DRC voltage is a predetermined voltage, and is generated by one or more components internal to the control chip 402. The voltage selector 420 compares $V_{DRC}$ and $V_{sft}$, and uses the higher of the these two voltages as its output voltage 442 ($V_{ref}$). The output voltage 442 is received by the error amplifier 450. The error amplifier 450 processes the received output voltage 442 and the received sensing voltage 458, and outputs a CMP signal 456 with the capacitor 454. The CMP signal 456 is sent to the gate driver 460.

As shown in FIG. 4, the control chip 402 also includes the logic component 470, the open-loop detector 480, and the protection component 490. The logic component 470 outputs an ENA signal 472 to the open-loop detector 480. The open-loop detector 480 also receives the sensing voltage 458. If enabled by the ENA signal 472, the open-loop detector 480 processes the sensing voltage 458, determines whether the CCFL 408 has an open circuit, and sends an OLP signal 482 to the protection component 490. In response, the protection component 490 outputs a signal 492 to the gate driver 460.

The gate driver 460 then processes the received signals 456 and 492 and sends the drive signal 464 through the terminal 462 to the power stage 404. If the OLP signal 482 indicates that the CCFL 408 has been determined to have an open circuit, the drive signal 464 would remain at the logic low level. Additionally, if the open-loop detector 180 is not enabled by the ENA signal 472, the drive signal 464 is not affected by the signal 492. For example, the drive signal 464 is generated based on the CMP signal 456, not the signal 492, if the ENA signal 472 is at the logic low level. Furthermore, the control chip 402 also includes the voltage generator 410. The voltage generator 410 provides a reference voltage to the resistor 414 through the terminal 412.

FIG. 5 is a simplified diagram showing convention signal curves for the system 400 for controlling brightness of one or more CCFLs. Specifically, a curve 510 represents the dimming voltage as a function of time. Additionally, a curve 520 represents the output voltage 442 as a function of time. Moreover, a curve 530 represents a function of lamp current as a function of time. The lamp current is the current that flows through the CCFL 408. Alternatively, the curve 530 represents a function of the sensing voltage 458 as a function of time.

FIG. 6 is a simplified conventional diagram showing the output voltage 442 of the voltage selector 420 as a function of the dimming voltage for the system 400 for controlling brightness of one or more CCFLs. As shown in FIG. 6, if the dimming voltage is smaller than a first threshold level ($V_{th1}$) but larger than or equal to zero, the output voltage 442 remains at a maximum voltage level ($V_{max}$).

If the dimming voltage is equal to or larger than the first threshold level ($V_{th1}$) but smaller than or equal to the DRC voltage, the output voltage 442 decreases with the increasing $V_{DIM}$, along a straight line 610. As discussed above, the DRC voltage is a predetermined voltage that is generated by one or more components internal to the control chip 402. As shown in FIG. 6, if the dimming voltage is equal to the DRC voltage, the output voltage 442 is equal to a minimum voltage level ($V_{min}$). Additionally, if the dimming voltage is larger than the DRC voltage, the output voltage 442 remains at the minimum level ($V_{min}$).

Specifically, the DRC voltage is a constant that is larger than the first threshold level ($V_{th1}$) and smaller than a second threshold level ($V_{th2}$). As shown in FIG. 6, the second threshold level ($V_{th2}$) corresponds to the intersection between the horizontal axis for $V_{DIM}$ and the extension of the straight line 610. Correspondingly, the minimum level ($V_{min}$) is a constant that is lower than $V_{max}$ but higher than zero.

Also, as shown in FIG. 4, the brightness of the CCFL 409 increases with the output voltage 442. If the output voltage 442 is at $V_{max}$, the brightness of the CCFL 409 is at the maximum. If the output voltage 442 is at $V_{min}$ the brightness of the CCFL 409 is at the minimum.

But the conventional burst dimming technology and the conventional analog dimming technology often do not provide a wide range of brightness for CCFLs. Hence it is highly desirable to improve the techniques for brightness control.

3. BRIEF SUMMARY OF THE INVENTION

The present invention is directed to brightness control. More particularly, the invention provides brightness control systems and methods with wide dimming range and adjustable minimum brightness. Merely by way of example, the invention has been applied to controlling brightness of cold-cathode fluorescent lamps (CCFLs). But it would be recognized that the invention has a much broader range of applicability.

According to one embodiment, a system for adjusting brightness of one or more cold-cathode fluorescent lamps includes a voltage selector configured to receive a dimming voltage and a first threshold voltage and generate an output voltage. The output voltage is selected from a group consisting of the dimming voltage and the first threshold voltage. Additionally, the system includes an oscillator coupled to a first capacitor and configured to generate a ramp signal with the first capacitor, and a signal generator configured to receive the ramp signal and the output voltage and generate a first signal. The first signal corresponds to a lamp brightness level. Moreover, the system includes a brightness detector configured to receive the first signal and output a second signal. The second signal indicates whether the lamp brightness level is higher than a threshold brightness level. Also, the system includes a logic component configured to output a third signal, an open-loop detector configured to receive at least the second signal and the third signal and generate a fourth signal in response to at least the second signal and the third signal, and a protection component configured to receive the fourth signal and generate a protection signal based on at least information associated with the fourth signal. Additionally, the system includes an error amplifier coupled to a second capacitor and configured to receive the first signal and a sensing voltage and to generate a fifth signal based on at least information associated with the first signal and the sensing voltage, and a gate driver configured to receive the protection signal and the fifth signal and generate a drive signal. For example, the open-loop detector is further configured to receive the sensing voltage, the sensing voltage being associated with a lamp current flowing through at least one cold-cathode fluorescent lamp, and process information associated with the second signal and the third signal. In another example, the open-loop detector is further configured to, if the second signal satisfies one or more predetermined first conditions and the third signal satisfies one or more predetermined second conditions, determine whether the cold-cathode fluorescent lamp is associated with an open circuit based on at least information associated with the sensing voltage and output the fourth signal indicating whether the cold-cathode fluorescent lamp is associated with the open circuit. In yet another example, the open-loop detector is further configured to, if the second signal does not satisfy the one or more predetermined first conditions, output the fourth signal regardless of the sensing voltage, the fourth signal indicating that the cold-cathode fluorescent lamp is not associated with the open circuit. In yet another example, the open-loop detector is further configured to, if the third signal does not satisfy the one or more predetermined second conditions, output the fourth signal regardless of the sensing voltage, the fourth signal indicating that the cold-cathode fluorescent lamp is not associated with the open circuit.

According to another embodiment, a method for adjusting brightness of one or more cold-cathode fluorescent lamps includes receiving a dimming voltage and a first threshold voltage. The dimming voltage is associated with a first magnitude, and the first threshold voltage is associated with a second magnitude. Additionally, the method includes generating an output voltage, the output voltage being selected from a group consisting of the dimming voltage and the first threshold voltage. Moreover, the method includes receiving the output voltage and a ramp signal, processing information associated with the output voltage and the ramp signal, and generating a first signal based on at least information associated with the output voltage and the ramp signal. The first signal corresponds to a lamp brightness level. Also, the method includes processing information associated with the first signal, and outputting a second signal based on at least information associated with the first signal. The second signal indicates whether the lamp brightness level is higher than a threshold brightness level. Additionally, the method includes receiving the second signal, a third signal, and a sensing voltage. The sensing voltage is associated with a lamp current flowing through at least one cold-cathode fluorescent lamp. Moreover, the method includes generating a fourth signal in response to at least the second signal and the third signal, receiving the first signal and the sensing voltage, generating a fifth signal based on at least information associated with the first signal and the sensing voltage, processing information associated with the fourth signal and the fifth signal, and generating a drive signal based on at least information associated with the fourth signal and the fifth signal. For example, the process for generating a fourth signal in response to at least the second signal and the third signal includes processing information associated with the second signal and the third signal. In another example, the process for generating a fourth signal in response to at least the second signal and the third signal includes, if the second signal satisfies one or more predetermined first conditions and the third signal satisfies one or more predetermined second conditions, determining whether the cold-cathode fluorescent lamp is associated with an open circuit based on at least information associated with the sensing voltage, and outputting the fourth signal indicating whether the cold-cathode fluorescent lamp is associated with the open circuit. In yet another example, the process for generating a fourth signal in response to at least the second signal and the third signal includes, if the second signal does not satisfy the one or more predetermined first conditions, outputting the fourth signal regardless of the sensing voltage, the fourth signal indicating that the cold-cathode fluorescent lamp is not associated with the open circuit. In yet another example, the process for generating a fourth signal in response to at least the second signal and the third signal includes, if the third signal does not satisfy the one or more predetermined second conditions, outputting the fourth signal regardless of the sensing voltage, the fourth signal indicating the cold-cathode fluorescent lamp is not associated with the open circuit.

According to yet another embodiment, a system for adjusting brightness of one or more cold-cathode fluorescent lamps includes a level shifter configured to receive a dimming voltage and generate a first output voltage based on at least information associated with the dimming voltage, and a voltage selector configured to receive the first output voltage and a first threshold voltage and generate a second output voltage. The second output voltage is selected from a group consisting of the first output voltage and the first threshold voltage, and the first threshold voltage corresponds to a lamp brightness level. Additionally, the system includes a brightness detector configured to receive the first threshold voltage and output a first signal, and the first signal indicates whether the lamp brightness level is higher than a threshold brightness level. Moreover, the system includes a logic component configured to output a second signal, and an open-loop detector configured to receive at least the first signal and the second signal and generate a third signal in response to at least the first signal and the second signal. Also, the system includes a protection component configured to receive the third signal and generate a protection signal based on at least information associated with the third signal, and an error amplifier coupled to a capacitor and configured to receive the second output voltage and a sensing voltage and to generate a fourth signal based on at least information associated with the second output voltage and the sensing voltage. Additionally, the system includes a gate driver configured to receive the protection signal and the fourth signal and generate a drive signal. For example, the open-loop detector is further configured to receive the sensing voltage, the sensing voltage being associated with a lamp current flowing through at least one cold-cathode fluorescent lamp, and process information associated with the first signal and the second signal. In another example, the open-loop detector is further configured to, if the first signal satisfies one or more predetermined first conditions and the second signal satisfies one or more predetermined second conditions, determine whether the cold-cathode fluorescent lamp is associated with an open circuit based on at least information associated with the sensing voltage and output the third signal indicating whether the cold-cathode fluorescent lamp is associated with the open circuit. In yet another example, the open-loop detector is further configured to, if the first signal does not satisfy the one or more predetermined first conditions, output the third signal regardless of the sensing voltage, the third signal indicating that the cold-cathode fluorescent lamp is not associated with the open circuit. In yet another example, the open-loop detector is further configured to, if the second signal does not satisfy the one or more predetermined second conditions, output the third signal regardless of the sensing voltage, the third signal indicating that the cold-cathode fluorescent lamp is not associated with the open circuit.

According to yet another embodiment, a method for adjusting brightness of one or more cold-cathode fluorescent lamps includes receiving a dimming voltage. The dimming voltage is associated with a first magnitude. Additionally, the method includes generating a first output voltage based on at least information associated with the dimming voltage, and receiving the first output voltage and a first threshold voltage. The first threshold voltage corresponds to a lamp brightness level and is associated with a second magnitude. Moreover, the method includes generating a second output voltage, the second output voltage being selected from a group consisting of the first output voltage and the first threshold voltage. Also, the method includes processing information associated with the first threshold voltage, and outputting a first signal based on at least information associated with the first threshold voltage. The first signal indicates whether the lamp brightness level is higher than a threshold brightness level. Additionally, the method includes receiving the first signal, a second signal, and a sensing voltage. The sensing voltage is associated with a lamp current flowing through at least one cold-cathode fluorescent lamp. Moreover, the method includes generating a third signal in response to at least the first signal and the second signal, receiving the second output voltage and a sensing voltage, generating a fourth signal based on at least information associated with the second output voltage and the sensing voltage, processing information associated with the third signal and the fourth signal, and generating a drive signal based on at least information associated with the third signal and the fourth signal. For example, the process for generating a third signal in response to at least the first signal and the second signal includes processing information associated with the first signal and the second signal. In another example, the process for generating a third signal in response to at least the first signal and the second signal includes, if the first signal satisfies one or more predetermined first conditions and the second signal satisfies one or more predetermined second conditions, determining whether the cold-cathode fluorescent lamp is associated with an open circuit based on at least information associated with the sensing voltage, and outputting the third signal indicating whether the cold-cathode fluorescent lamp is associated with the open circuit. In yet another example, the process for generating a third signal in response to at least the first signal and the second signal includes, if the first signal does not satisfy the one or more predetermined first conditions, outputting the third signal regardless of the sensing voltage, the third signal indicating that the cold-cathode fluorescent lamp is not associated with the open circuit. In yet another example, the process for generating a third signal in response to at least the first signal and the second signal includes, if the second signal does not satisfy the one or more predetermined second conditions, outputting the third signal regardless of the sensing voltage, the third signal indicating that the cold-cathode fluorescent lamp is not associated with the open circuit.

Many benefits are achieved by way of the present invention over conventional techniques. Certain embodiments of the present invention allow precise adjustment of minimum brightness for one or more CCFLs. For example, the minimum brightness is adjusted through one or more components that are external to the control chip. In another example, either the burst dimming technology or the analog dimming technology is used. Some embodiments of the present invention provide a wide range of brightness for one or more CCFLs. For example, with burst dimming technology, the brightness can range from 0% to 100% in terms of duty cycle of the burst signal.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to brightness control. More particularly, the invention provides brightness control systems and methods with wide dimming range and adjustable minimum brightness. Merely by way of example, the invention has been applied to controlling brightness of cold-cathode fluorescent lamps (CCFLs). But it would be recognized that the invention has a much broader range of applicability.

Figure 1:
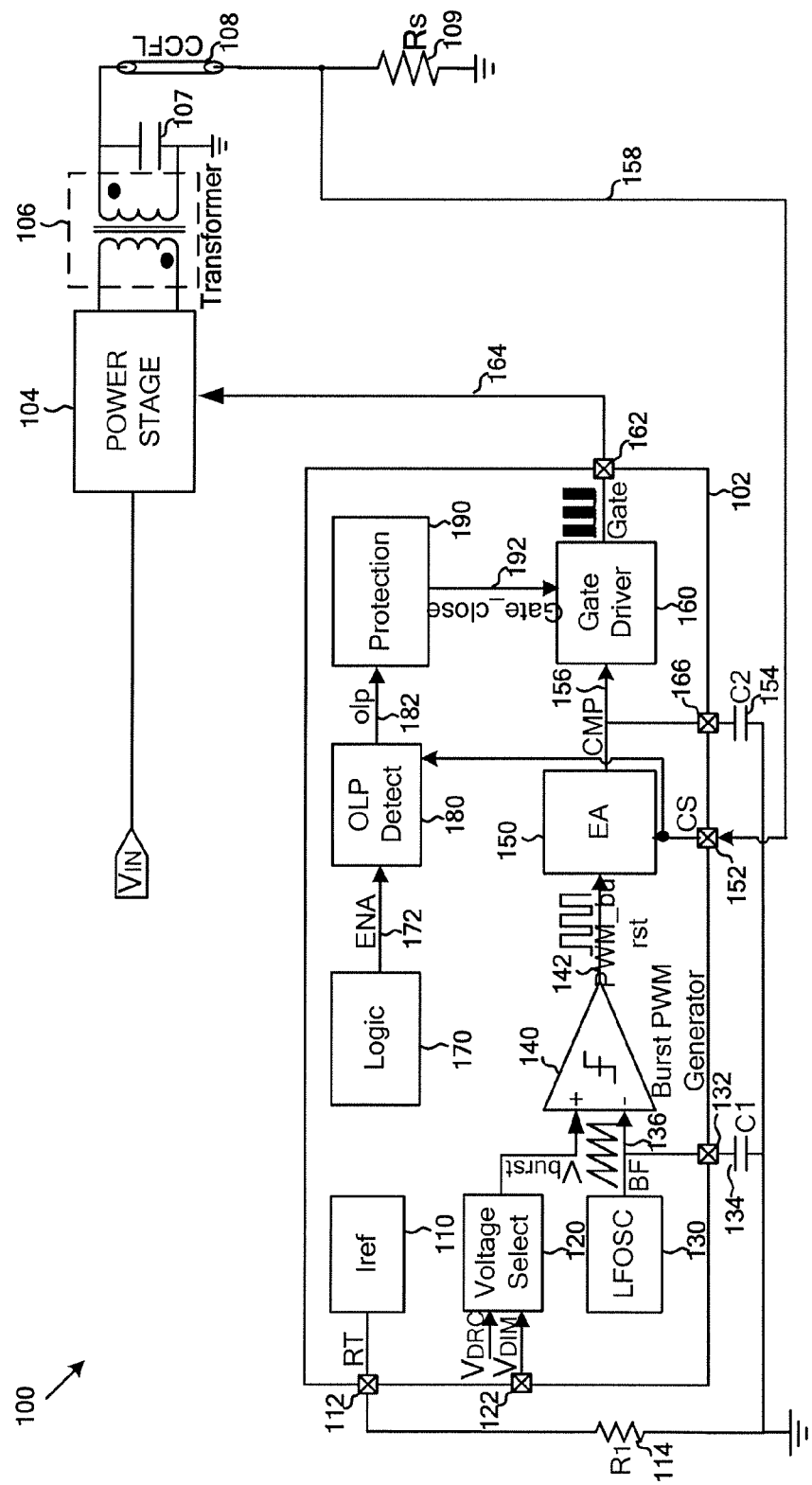
FIG. 1 is a simplified diagram showing a conventional system for controlling brightness of one or more CCFLs.
Figure 2:
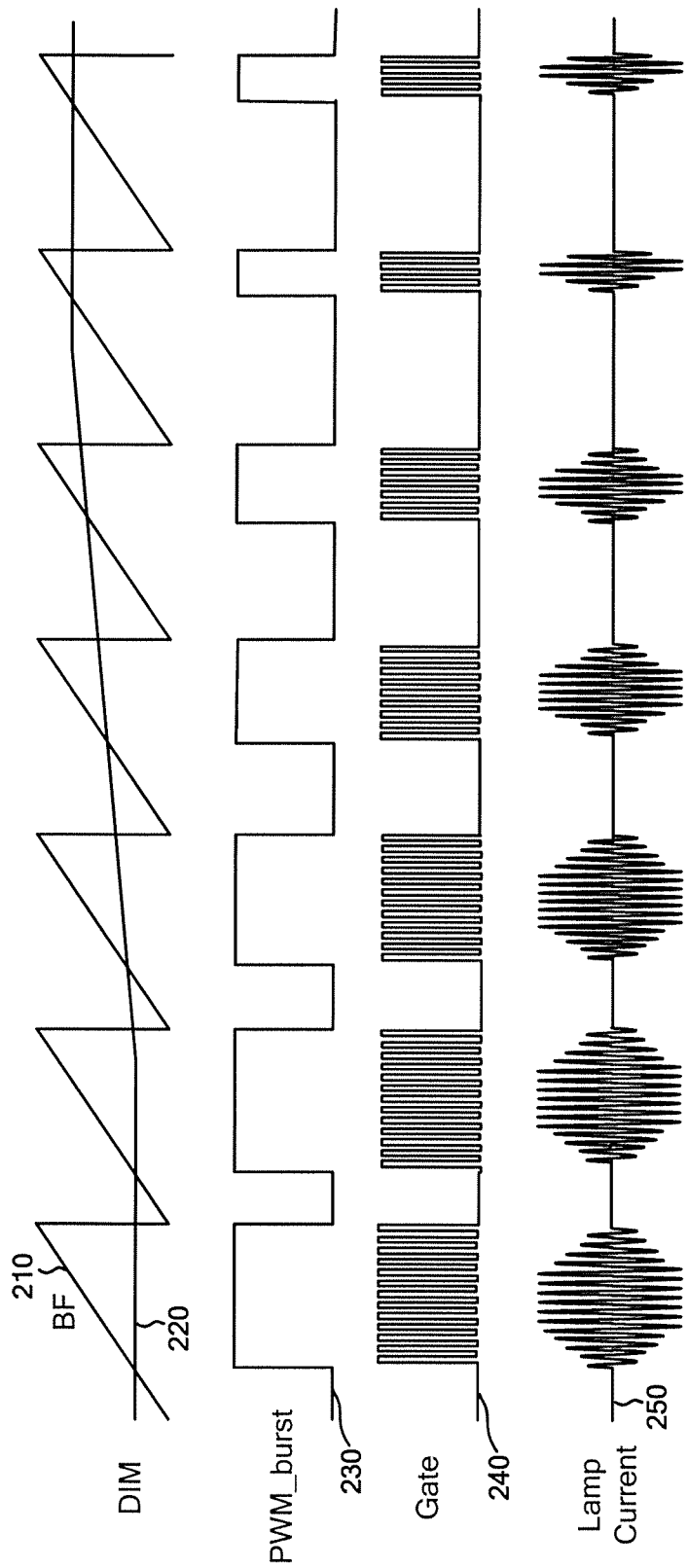
FIG. 2 is a simplified diagram showing convention signal curves for the system for controlling brightness of one or more CCFLs.
Figure 3:
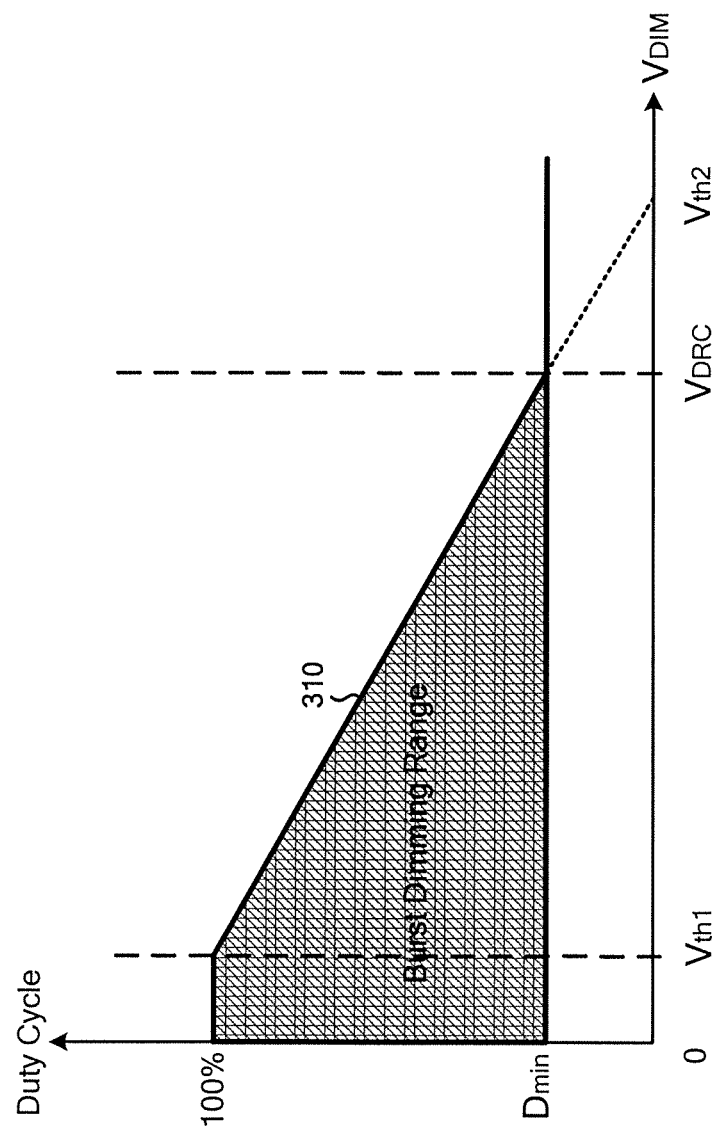
FIG. 3 is a simplified conventional diagram showing duty cycle of the burst signal as a function of the dimming voltage for the system for controlling brightness of one or more CCFLs.
Figure 4:
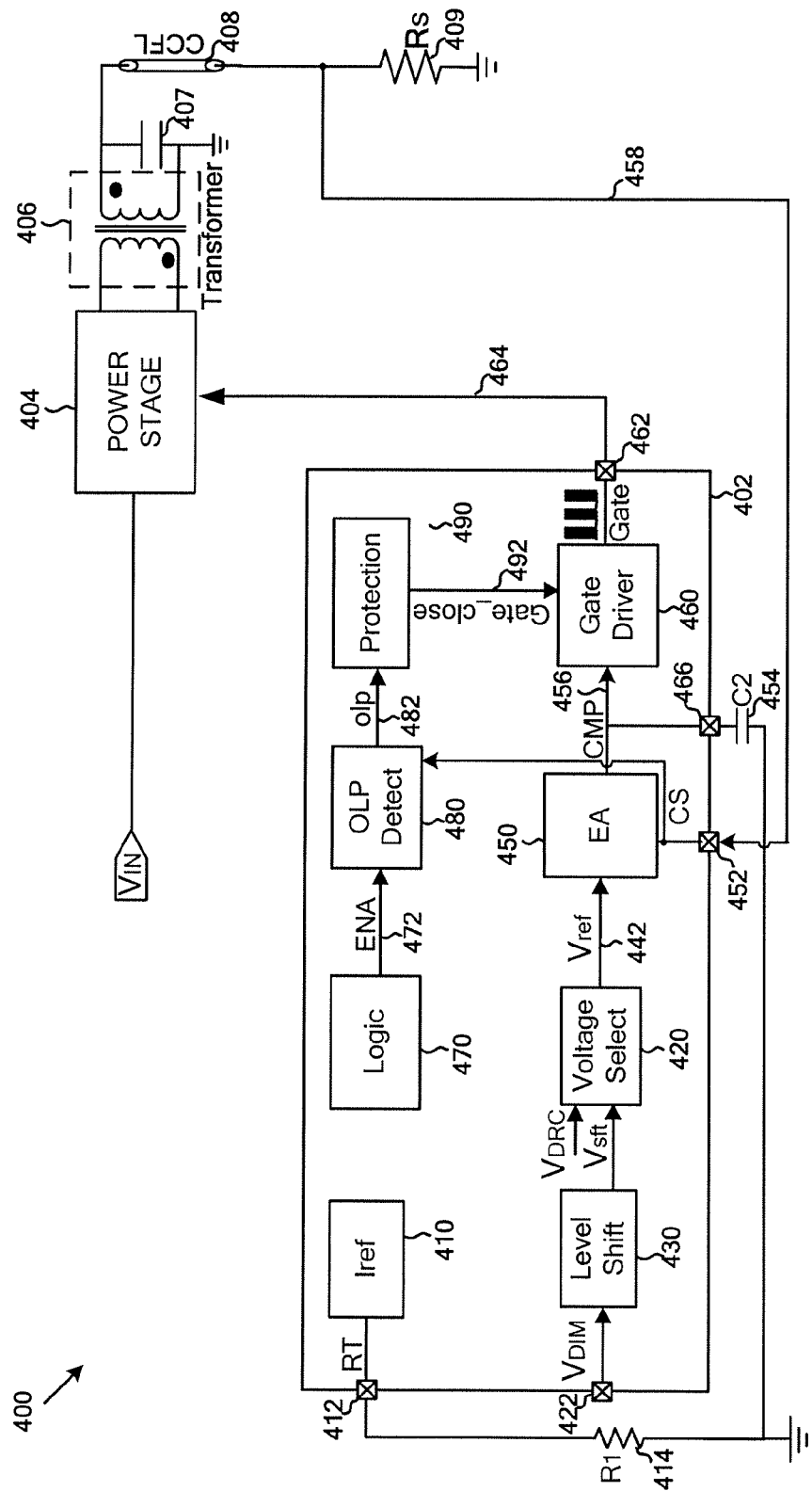
FIG. 4 is a simplified diagram showing another conventional system for controlling brightness of one or more CCFLs.
Figure 5:
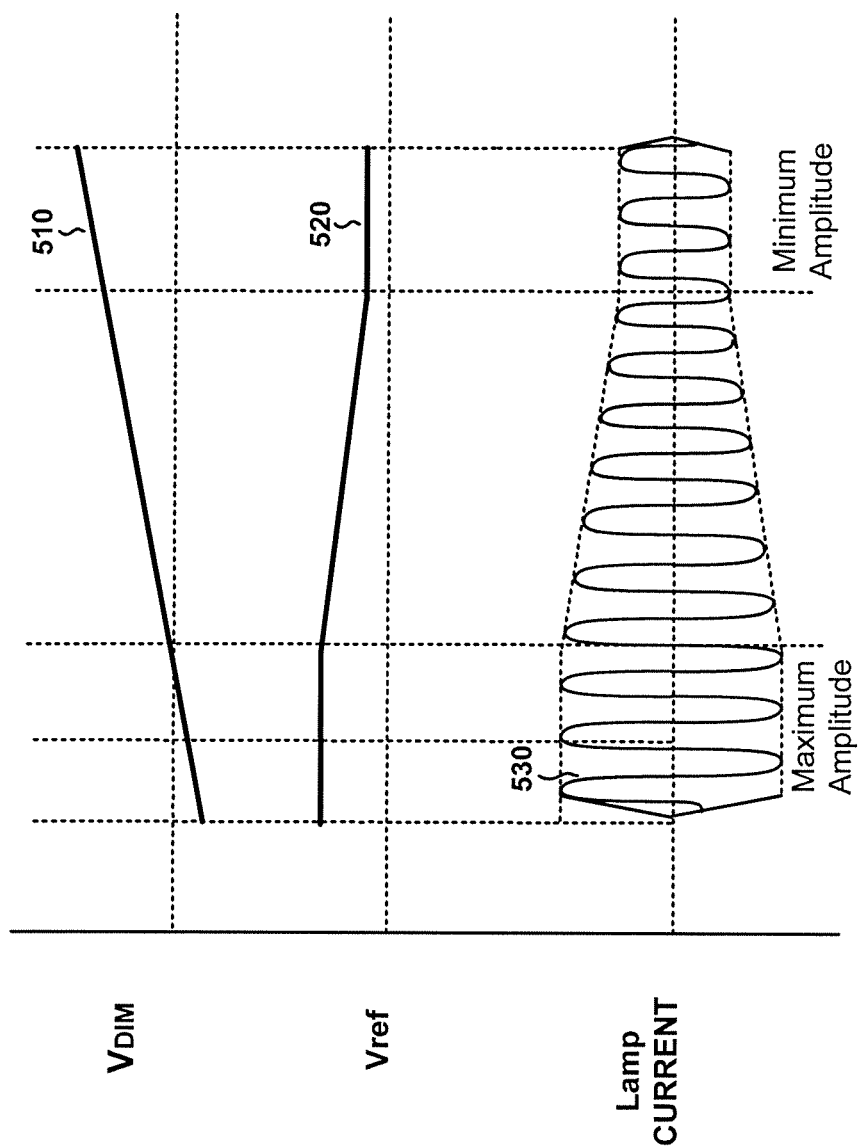
FIG. 5 is a simplified diagram showing convention signal curves for the system for controlling brightness of one or more CCFLs.
Figure 6:
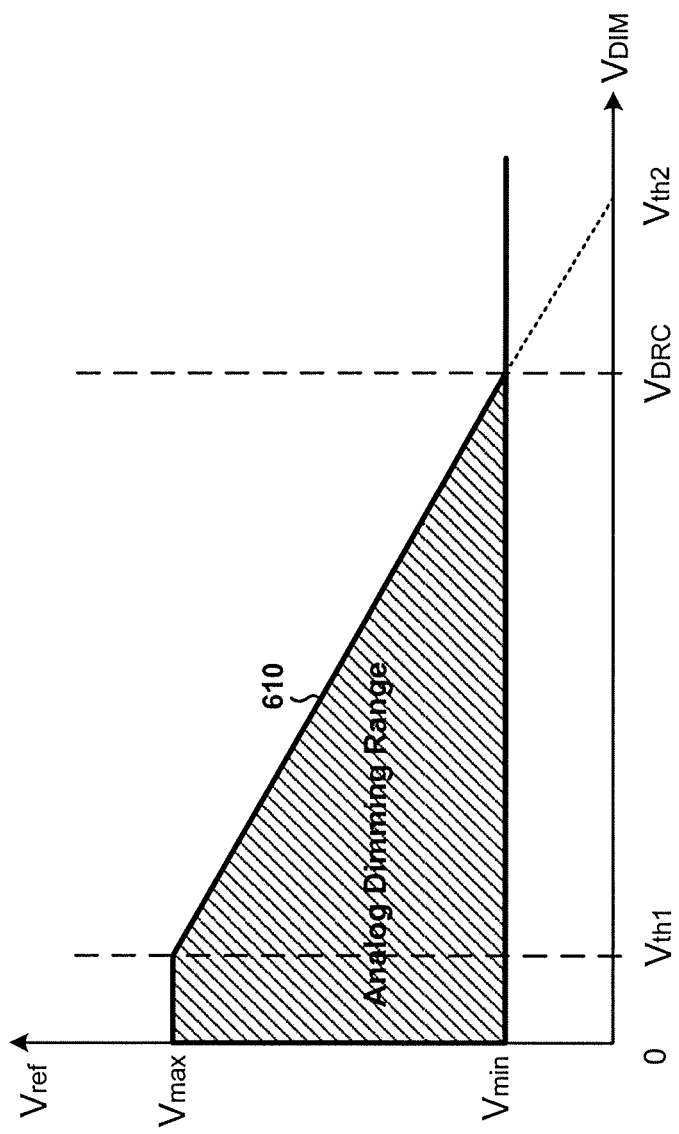
FIG. 6 is a simplified conventional diagram showing the output voltage of the voltage selector as a function of the dimming voltage for the system for controlling brightness of one or more CCFLs.
Figure 7:
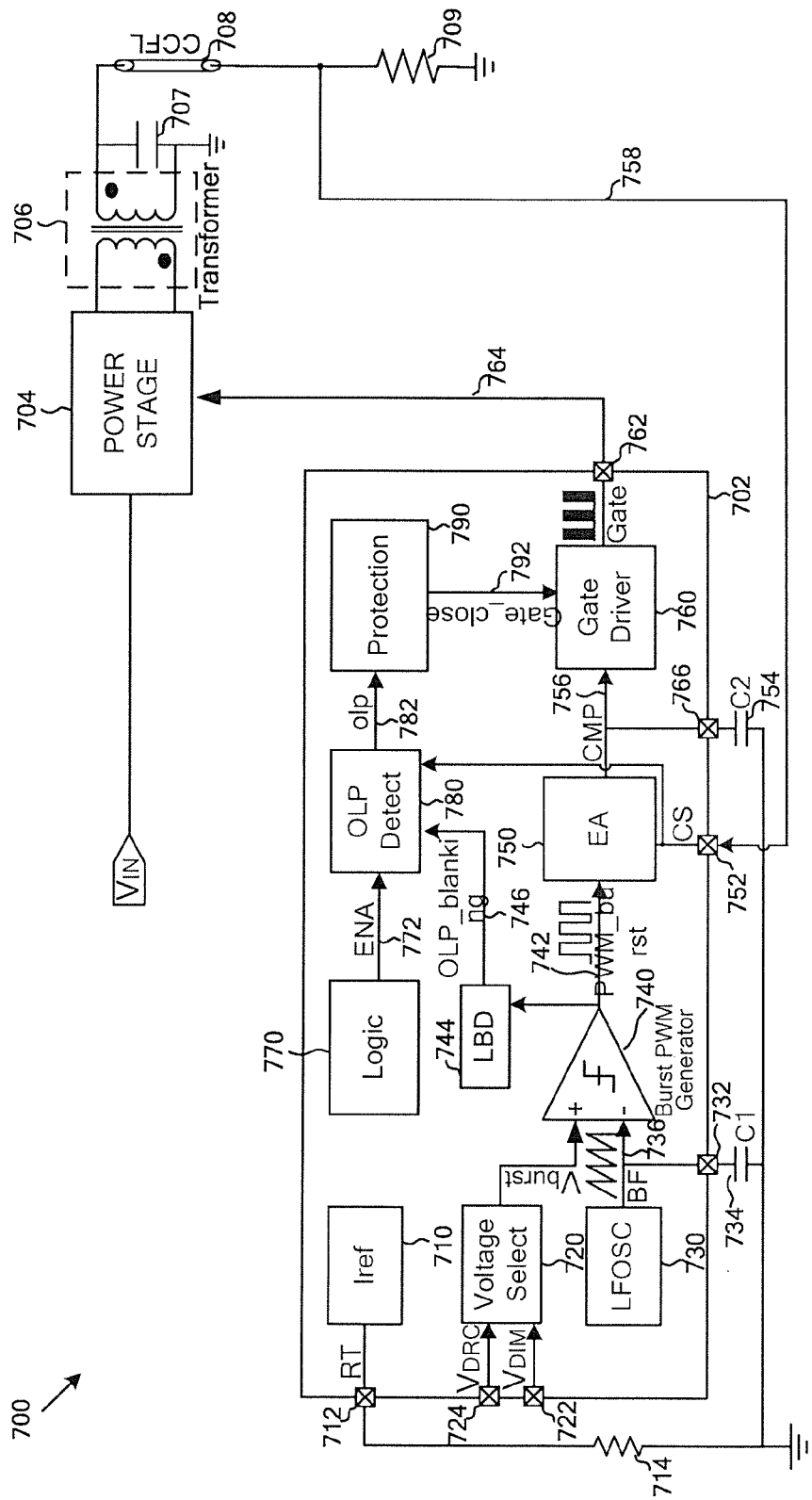
FIG. 7 is a simplified diagram showing a system for controlling brightness of one or more CCFLs according to one embodiment of the present invention.

FIG. 7 is a simplified diagram showing a system for controlling brightness of one or more CCFLs according to one embodiment of the present invention. This diagram is merely an example, which should not unduly limit the scope of the claims. One of ordinary skill in the art would recognize many variations, alternatives, and modifications.

For example, the system 700 includes a control chip 702, a power stage 704, a transformer 706, a CCFL 708, resistors 709 and 714, and capacitors 707, 734 and 754. In another example, the control chip 702 includes a voltage generator 710, a voltage selector 720, an oscillator 730, a burst generator 740, a low brightness detector 744, an error amplifier 750, a gate driver 760, a logic component 770, an open-loop detector 780, and a protection component 790. In yet another example, the control chip 702 also includes terminals 712, 722, 724, 732, 752, 762, and 766.

According to one embodiment, the voltage generator 710, the voltage selector 720, the oscillator 730, the burst generator 740, the error amplifier 750, the gate driver 760, the logic component 770, and the protection component 790 are the same as the voltage generator 110, the voltage selector 120, the oscillator 130, the burst generator 140, the error amplifier 150, the gate driver 160, the logic component 170, and the protection component 190, respectively.

As shown in FIG. 7, through the terminal 712, the voltage generator 710 is coupled to the resistor 714 according to one embodiment. In another embodiment, the oscillator 730 and the burst generator 740 are coupled to the capacitor 734 through the terminal 732. For example, the oscillator 730 is a low frequency oscillator. In yet another embodiment, the error amplifier 750 is coupled to the CCFL 708 and the resistor 709 through the terminal 752. In yet another embodiment, the error amplifier 750 and the gate driver 760 are coupled to the capacitor 754 through the terminal 766. In yet another embodiment, the gate driver 760 is coupled to the power stage 704 through the terminal 762.

As an example, the control chip 702 regulates the start-up, normal operation, and protection of the system 700. In one embodiment, the control chip 702 sends a drive signal 764 to the power stage 704. In another embodiment, the power stage 704 also receives a system input voltage ($V_{IN}$) and generates a transformer input voltage, which is received by the transformer 706. In yet another embodiment, the transformer 706, together with the capacitor 707, supplies a lamp voltage to the CCFL 708. In yet another embodiment, the CCFL 708 is coupled to the resistor 709, which converts the current that flows through the CCFL 708 into a sensing voltage 758. In yet another embodiment, the sensing voltage 758 is then received by the error amplifier 750 through the terminal 752.

As shown in FIG. 7, the error amplifier 750 is a part of the control chip 702, which also includes at least the voltage selector 720, according to an embodiment. For example, the voltage selector 720 receives a DRC voltage ($V_{DRC}$) and a dimming voltage ($V_{DIM}$). In one embodiment, the DRC voltage can be adjusted and is supplied through the terminal 724 by one or more components external to the control chip 702. In another embodiment, the dimming voltage can be adjusted and is supplied through the terminal 722 from one or more components external to the control chip 702. In response, the voltage selector 720, for example, compares $V_{DRC}$ and $V_{DIM}$ and uses the lower of the these two voltages as its output voltage $V_{burst}$.

According to another embodiment, the oscillator 730, together with the capacitor 734, generates a ramp signal 736. For example, the ramp signal 736 is received by the burst generator 740, which also receives the voltage $V_{burst}$. In another example, the burst generator 740 compares the voltage $V_{burst}$ and the ramp signal 736, and generates a burst signal 742. In yet another example, the burst signal 742 is a pulse-width-modulation burst signal.

In one embodiment, the burst signal 742 is received by the error amplifier 750. For example, the error amplifier 750 processes the received burst signal 742 and the received sensing voltage 758, and outputs a CMP signal 756 with the capacitor 754. In another example, the CMP signal 756 is sent to the gate driver 760. In another embodiment, the burst signal 742 is also received by the low brightness detector 744. For example, the low brightness detector 744 processes the burst signal 742 and outputs a brightness signal 746 to the open-loop detector 780.

According to one embodiment, the brightness signal 746 indicates whether the brightness of the CCFL 708 would be above a predetermined brightness threshold. For example, the burst signal 742 has a period T, which is equal to the sum of $T_{on}$ and $T_{off}$. In another example, during $T_{on}$, the burst signal 742 is at the logic high level, and during $T_{off}$, the burst signal 742 is at the logic low level. In yet another example, the low brightness detector 744 processes the burst signal 742, determines the length of $T_{on}$, and compares $T_{on}$ and $T_{th}$. $T_{th}$ is a time period that corresponds to the predetermined brightness threshold. According to another embodiment, if $T_{on} > T_{th}$, the lamp brightness is determined to be above the predetermined brightness threshold, and if $T_{on} \leq T_{th}$, the lamp brightness is determined not to be above the predetermined brightness threshold.

As shown in FIG. 7, the control chip 702 also includes the logic component 770, the open-loop detector 780, and the protection component 790 according to one embodiment. For example, the logic component 770 outputs an ENA signal 772 to the open-loop detector 780. In another example, the open-loop detector 780 also receives the brightness signal 746 and the sensing voltage 758.

According to one embodiment, if the open-loop detector 780 is enabled by both the brightness signal 746 and the ENA signal 772, the open-loop detector 780 processes the sensing voltage 758, determines whether the CCFL 708 has an open circuit, and sends an OLP signal 782 to the protection component 790. In response, the protection component 790 outputs a signal 792 to the gate driver 760.

According to another embodiment, the gate driver 760 processes the received signals 756 and 792 and sends the drive signal 764 through the terminal 762 to the power stage 704. For example, if the OLP signal 782 indicates that the CCFL 708 has been determined to have an open circuit, the drive signal 764 would remain at the logic low level. In another example, if the open-loop detector 780 is not enabled by both the brightness signal 746 and the ENA signal 772, the drive signal 764 is not affected by the signal 792. According to one embodiment, the drive signal 764 is generated based on the CMP signal 756, not the signal 792, if at least one of the brightness signal 746 and the ENA signal 772 is at the logic low level.

Also as shown in FIG. 7, the control chip 702 also includes the voltage generator 710 according to an embodiment. For example, the voltage generator 710 provides a reference voltage to the resistor 714 through the terminal 712.

Figure 8:
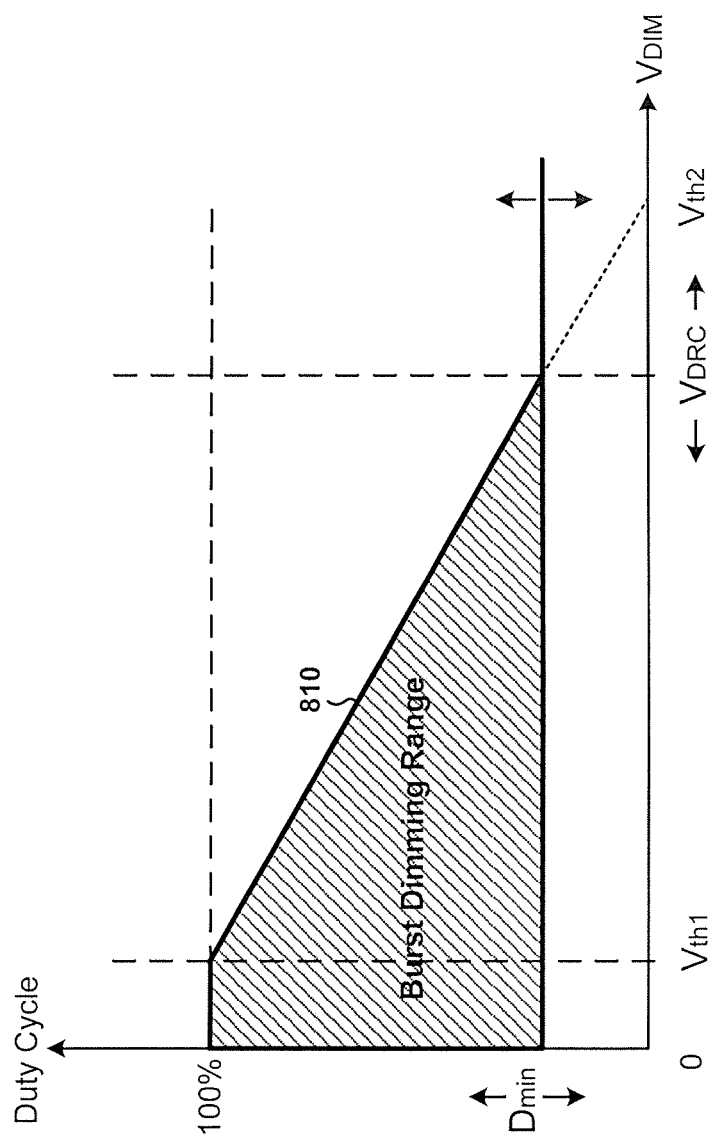
FIG. 8 is a simplified diagram showing duty cycle of the burst signal as a function of the dimming voltage for the system for controlling brightness of one or more CCFLs according to one embodiment of the present invention.

FIG. 8 is a simplified diagram showing duty cycle of the burst signal 742 as a function of the dimming voltage for the system 700 for controlling brightness of one or more CCFLs according to one embodiment of the present invention. This diagram is merely an example, which should not unduly limit the scope of the claims. One of ordinary skill in the art would recognize many variations, alternatives, and modifications.

For example, if the dimming voltage is smaller than a first threshold level ($V_{th1}$) but larger than or equal to zero, the duty cycle of the burst signal 742 remains at 100%. In another example, if the dimming voltage is equal to or larger than the first threshold level ($V_{th1}$) but smaller than or equal to the DRC voltage, the duty cycle of the burst signal 742 decreases with the increasing $V_{DIM}$, along a straight line 810.

As shown in FIG. 8, if the dimming voltage is equal to the DRC voltage, the duty cycle is equal to a minimum level ($D_{min}$). In one embodiment, if the dimming voltage is larger than the DRC voltage, the duty cycle remains at the minimum level ($D_{min}$). In another embodiment, the DRC voltage can be adjusted and is provided by one or more components external to the control chip 102.

For example, the DRC voltage can be varied from the first threshold level ($V_{th1}$) to the second threshold level ($V_{th2}$). As shown in FIG. 8, the second threshold level ($V_{th2}$) corresponds to the intersection between the horizontal axis for $V_{DIM}$ and the extension of the straight line 810. In another example, the minimum level ($D_{min}$) decreases with the increasing DRC voltage, along the straight line 810 and/or its extension. In one embodiment, the minimum level ($D_{min}$) can be varied from 100% to zero.

Also, as shown in FIG. 7, the brightness of the CCFL 709 increases with the duty cycle of the burst signal 742 according to one embodiment. For example, if the duty cycle of the burst signal 742 is at 100%, the brightness of the CCFL 709 is at the maximum. In another example, if the duty cycle of the burst signal 742 is at the minimum level ($D_{min}$), the brightness of the CCFL 709 is at the minimum.

Figure 9:
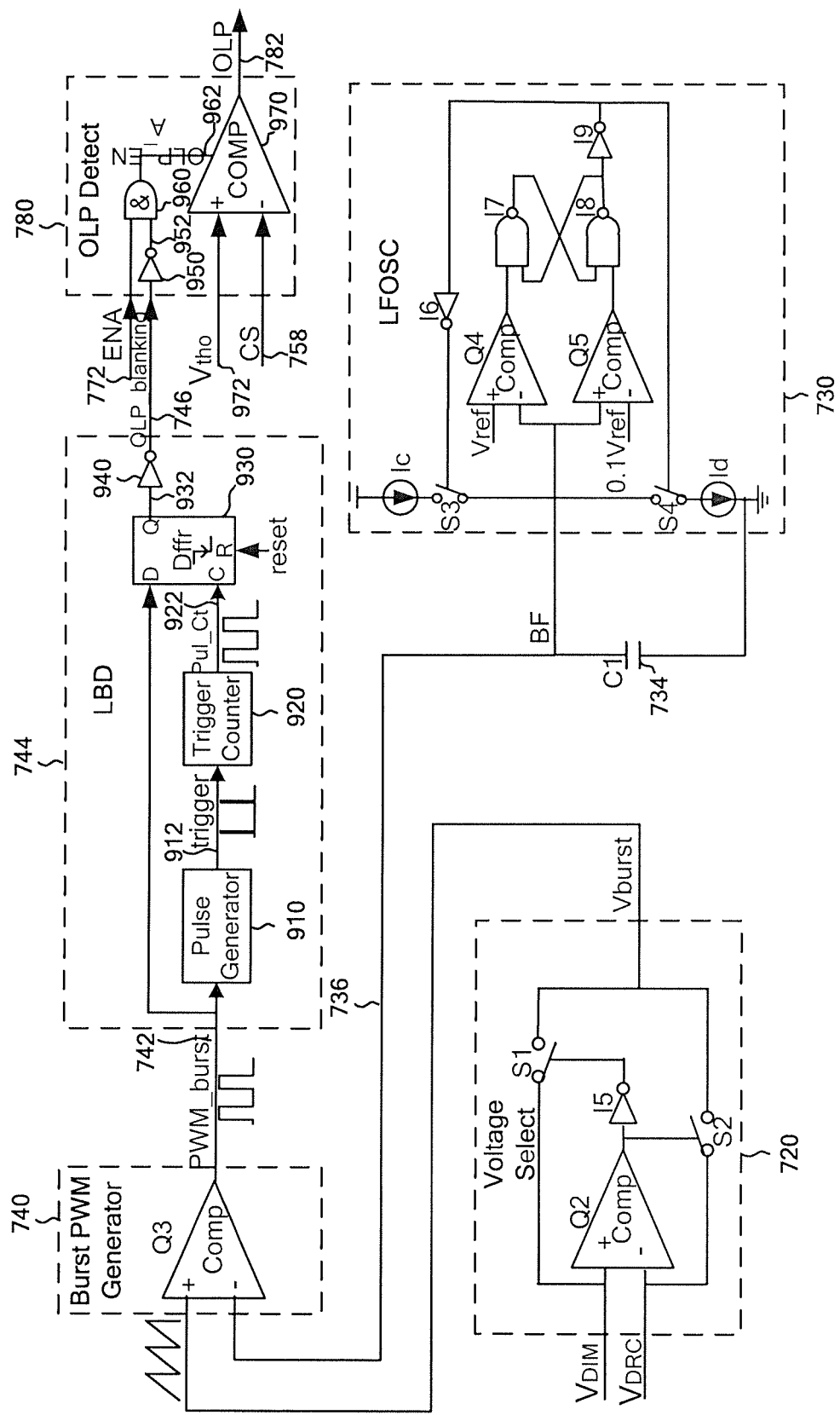
FIG. 9 is a simplified diagram showing a combination of the voltage selector, the oscillator, the burst generator, the low brightness detector, and the open-loop detector as part of the system for controlling brightness of one or more CCFLs according to one embodiment of the present invention.

FIG. 9 is a simplified diagram showing a combination of the voltage selector 720, the oscillator 730, the burst generator 740, the low brightness detector 744, and the open-loop detector 780 as part of the system 700 for controlling brightness of one or more CCFLs according to one embodiment of the present invention. This diagram is merely an example, which should not unduly limit the scope of the claims. One of ordinary skill in the art would recognize many variations, alternatives, and modifications. As shown in FIG. 9, the low brightness detector 744, for example, includes a pulse generator 910, a trigger counter 920, a flip-flop 930, and an NOT gate 940. In another example, the pulse generator 910 receives the burst signal 742 and generates a trigger signal 912. In yet another example, the trigger signal 912 is received by the trigger counter 920, which in response generates a counter signal 922. As shown in FIG. 9, the counter signal 922 is received by the flip-flop 930. In one embodiment, the flip-flop 930 also receives at least the burst signal 742 and generates at least an output signal 932. In another embodiment, the output signal 932 is received by the NOT 940, which generates the brightness signal 746.

Figure 10:
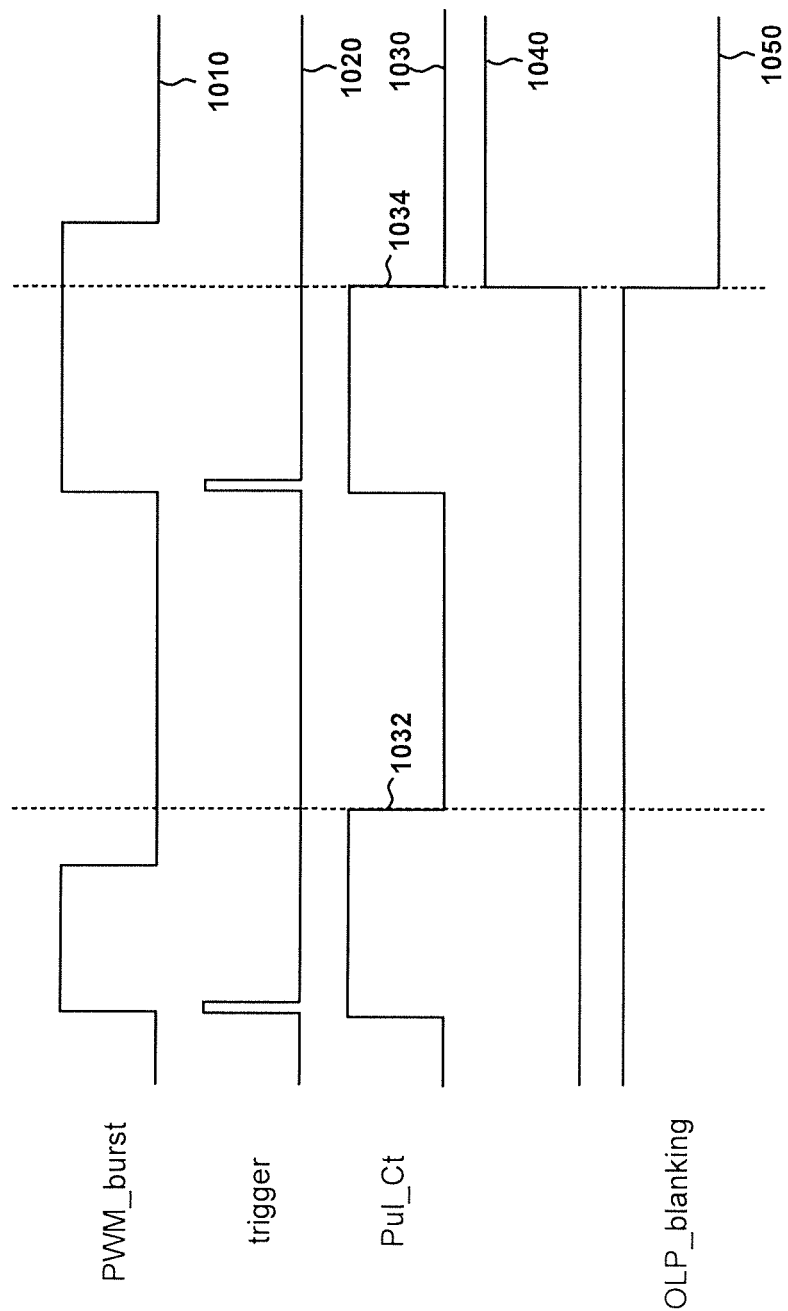
FIG. 10 is a simplified diagram showing signal curves for the low brightness detector as part of the system for controlling brightness of one or more CCFLs according to an embodiment of the present invention.

FIG. 10 is a simplified diagram showing signal curves for the low brightness detector 744 as part of the system 700 for controlling brightness of one or more CCFLs according to an embodiment of the present invention. This diagram is merely an example, which should not unduly limit the scope of the claims. One of ordinary skill in the art would recognize many variations, alternatives, and modifications.

For example, a curve 1010 represents the burst signal 742 as a function of time, and a curve 1020 represents the trigger signal 912 as a function of time. In another example, a curve 1030 represents the counter signal 922 as a function of time, and a curve 1040 represents the output signal 932 as a function of time. In yet another example, a curve 1050 represents the brightness signal 746 as a function of time.

As shown in FIGS. 9 and 10, the rising edges of the burst signal 742 is detected by the pulse generator 910, which in response generates the trigger signal 912 according to an embodiment. For example, the trigger signal 912 includes multiple pulses, each of which corresponds to a rising edge of the burst signal 742. In another example, the trigger signal 912 is received by the trigger counter 920. In one embodiment, the trigger counter 920 detects the pluses of the trigger signal 912, and in response, generates the counter signal 922. In another embodiment, the counter signal 922 includes multiple pulses, each of which corresponds to one of the pulses of the trigger signal 912. For example, the rising edges of the counter signal 922 is triggered by the rising edges of the trigger signal 912, respectively. In another example, the pulse width of the counter signal 922 corresponds to the predetermined brightness threshold. In yet another example, the pulse width of the counter signal 922 is equal to $T_{th}$, and $T_{th}$ is a time period that corresponds to the predetermined brightness threshold.

According to one embodiment, the flip-flop 930 is a D flip-flop, which may changes its output at falling edges of the clock input. For example, at each falling edge of the counter signal 922, the output signal 932 becomes or remains to be the same as the burst signal 742. As shown in FIG. 10, at a falling edge 1032, the burst signal 742 is at the logic low level, so the output signal 932 remains at the logic low level. Also as shown in FIG. 10, at a falling edge 1034, the burst signal 742 is at the logic high level, so the output signal 932 changes to the logic low level. According to another embodiment, the flip-flop 930 compares the pulse width of the counter signal 922 and the pulse width of the burst signal 742 and generates the output signal 932. For example, if the pulse width of the burst signal 742 is smaller than the pulse width of the counter signal 922, the output signal 932 is at the logic low level. In another example, if the pulse width of the burst signal 742 is larger than the pulse width of the counter signal 922, the output signal 932 is at the logic high level.

According to yet another embodiment, the brightness signal 746 is inverted from the output signal 932. For example, if the pulse width of the burst signal 742 is smaller than the pulse width of the counter signal 922, the brightness signal 746 is at the logic high level. In another example, if the pulse width of the burst signal 742 is larger than the pulse width of the counter signal 922, the brightness signal 746 is at the logic low level.

Returning to FIG. 9, the open-loop detector 780 includes, for example, a NOT gate 950, an AND gate 960, and a comparator 970. In one embodiment, the NOT gate 950 receives the brightness signal 746 and generates a signal 952. In another embodiment, the signal 952 is received by the AND gate 960, which also receives the ENA signal 772 and outputs a signal 962.

For example, the signal 962 is received by the comparator 970 as an enabling signal. In another example, the comparator 970 also receives the sensing voltage 758 and a threshold voltage 972 ($V_{tho}$), and outputs the OLP signal 782. According to one embodiment, if the signal 962 is at the logic low level, the OLP signal 782 remains at the logic low level. According to another embodiment, if the signal 962 is at the logic high level, the OLP signal 782 is at the logic high level if the threshold voltage 972 is higher than the sensing voltage 758 and the OLP signal 782 is at the logic low level if the threshold voltage 972 is lower than the sensing voltage 758. According to yet another embodiment, if the sensing voltage 758 is below the threshold voltage 972, the CCFL 708 is determined to have an open circuit.

As discussed above and further emphasized here, FIGS. 7 and 8 are merely examples, which should not unduly limit the scope of the claims. One of ordinary skill in the art would recognize many variations, alternatives, and modifications. For example, the resistor 714 is replaced by a voltage divider that can provide the DRC voltage ($V_{DRC}$) to the voltage selector 720.

Figure 11:
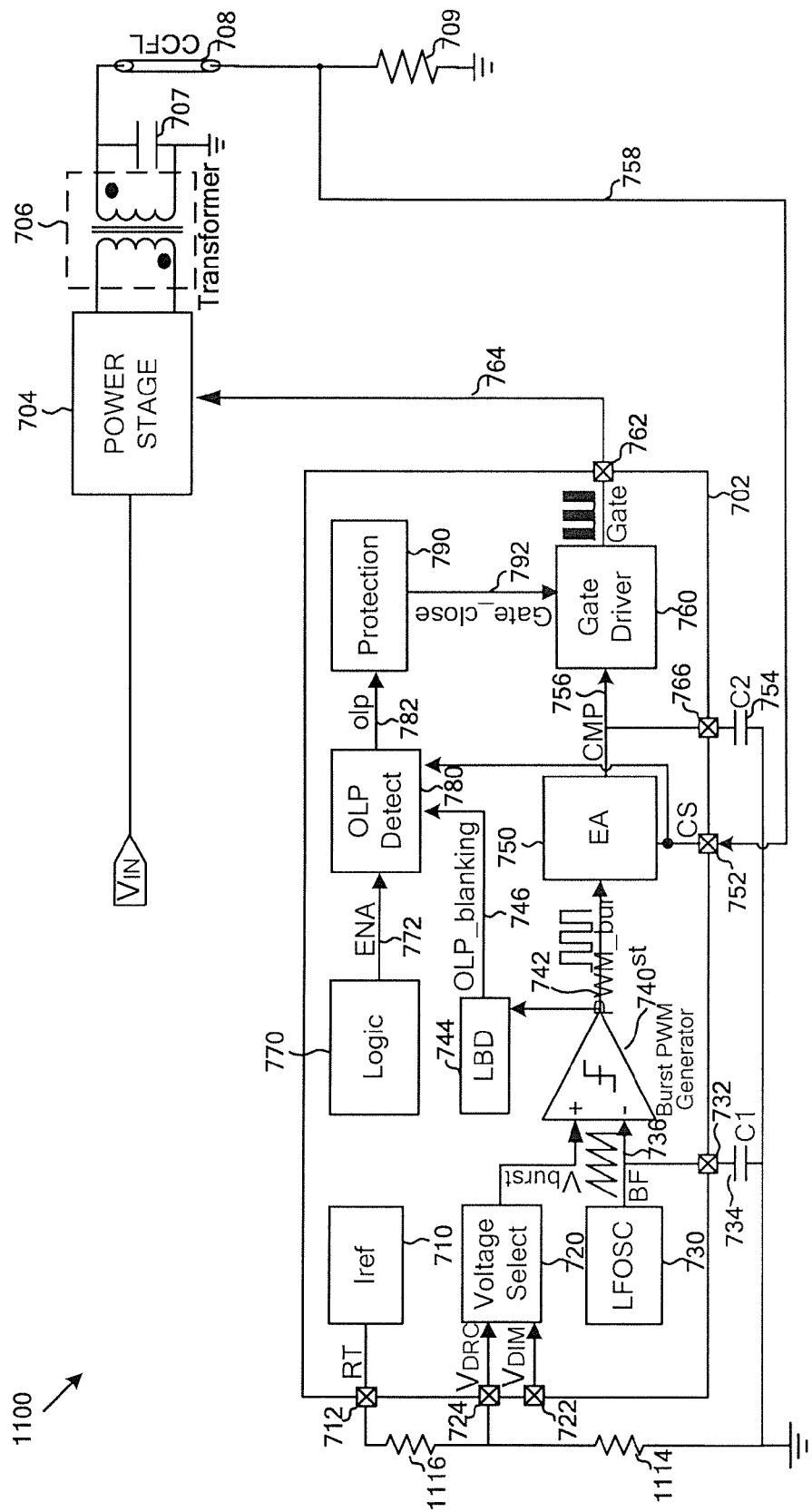
FIG. 11 is a simplified diagram showing a system for controlling brightness of one or more CCFLs according to another embodiment of the present invention.

FIG. 11 is a simplified diagram showing a system for controlling brightness of one or more CCFLs according to another embodiment of the present invention. This diagram is merely an example, which should not unduly limit the scope of the claims. One of ordinary skill in the art would recognize many variations, alternatives, and modifications.

As shown in FIG. 11, the system 1100 includes the control chip 702, the power stage 704, the transformer 706, the CCFL 708, the resistor 709, the capacitors 707, 734 and 754, and resistors 1114 and 1116. For example, the control chip 702 includes the voltage generator 710, the voltage selector 720, the oscillator 730, the burst generator 740, the low brightness detector 744, the error amplifier 750, the gate driver 760, the logic component 770, the open-loop detector 780, and the protection component 790. In another example, the control chip 702 also includes the terminals 712, 722, 724, 732, 752, 762, and 766.

In one embodiment, through the terminal 712, the voltage generator 710 is coupled to the resistor 1116, which is connected to the resistor 1114. For example, the resistors 1114 and 1116 form a voltage divider, which provides the DRC voltage ($V_{DRC}$) to the voltage selector 720. In another example, the DRC voltage ($V_{DRC}$) can be adjusted by changing the resistors 1114 and 1116.

In another embodiment, the minimum level ($D_{min}$) for the duty cycle of the burst signal 742 is determined as follows:

$$D_{min} = k \times \frac{R_2}{R_1 + R_2} \qquad (1)$$

where $R_1$ is the resistance value of the resistor 1114, and $R_2$ is the resistance value of the resistor 1116. k is a constant that is independent of $R_1$ and $R_2$. As shown by Equation 1, the minimum for the brightness of the CCFL 708 can be adjusted by changing the resistance values of resistors 1114 and 1116.

Figure 12:
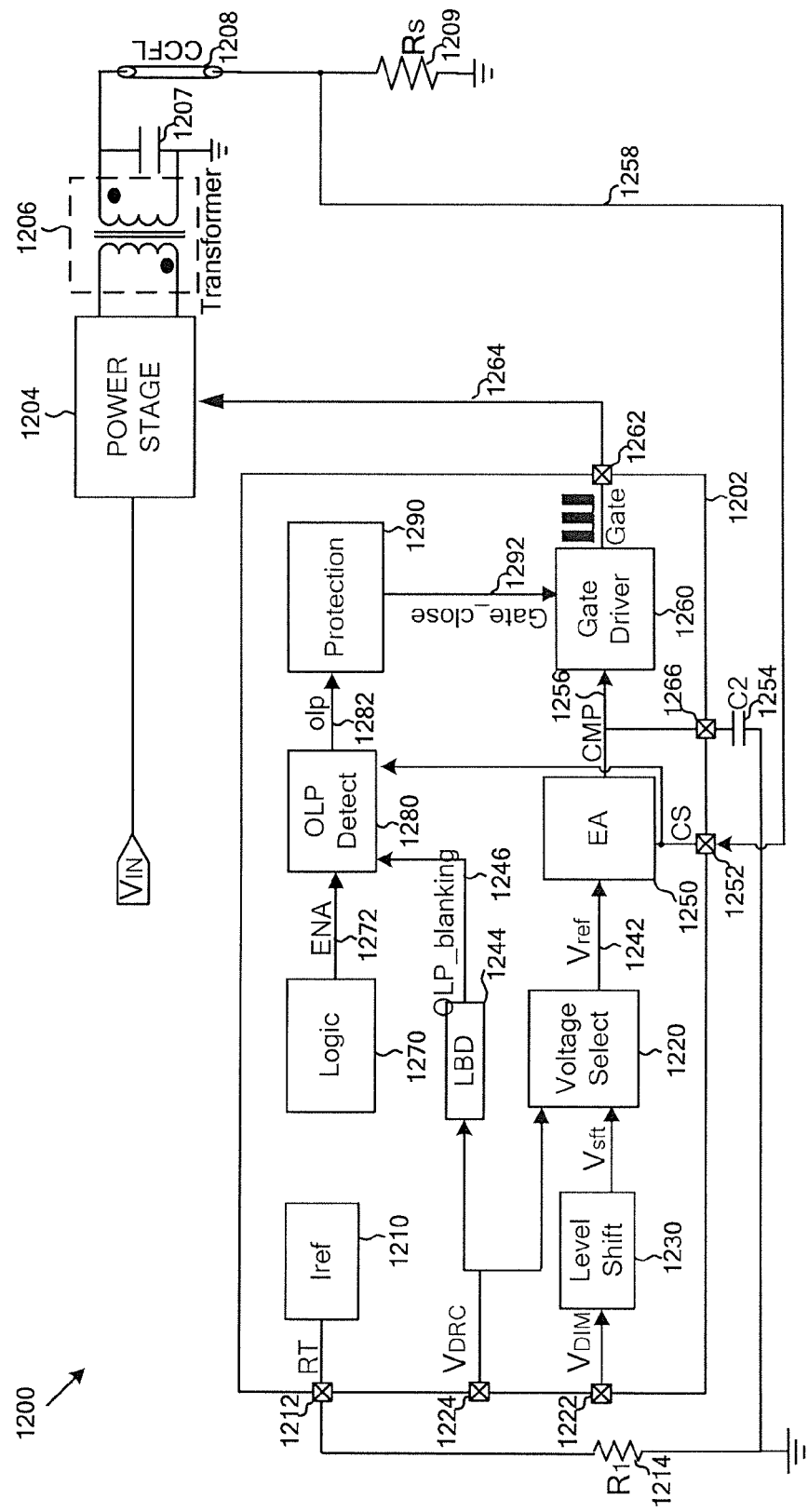
FIG. 12 is a simplified diagram showing a system for controlling brightness of one or more CCFLs according to yet another embodiment of the present invention.

FIG. 12 is a simplified diagram showing a system for controlling brightness of one or more CCFLs according to yet another embodiment of the present invention. This diagram is merely an example, which should not unduly limit the scope of the claims. One of ordinary skill in the art would recognize many variations, alternatives, and modifications.

For example, the system 1200 includes a control chip 1202, a power stage 1204, a transformer 1206, a CCFL 1208, resistors 1209 and 1214, and capacitors 1207 and 1254. In another example, the control chip 1202 includes a voltage generator 1210, a voltage selector 1220, a level shifter 1230, a low brightness detector 1244, an error amplifier 1250, a gate driver 1260, a logic component 1270, an open-loop detector 1280, and a protection component 1290. In yet another example, the control chip 1202 also includes terminals 1212, 1222, 1224, 1252, 1262, and 1266.

According to one embodiment, the voltage generator 1210, the voltage selector 1220, the level shifter 1230, the error amplifier 1250, the gate driver 1260, the logic component 1270, and the protection component 1290 are the same as the voltage generator 410, the voltage selector 420, the level shifter 430, the error amplifier 450, the gate driver 460, the logic component 470, and a protection component 490, respectively.

As shown in FIG. 12, through the terminal 1212, the voltage generator 1210 is coupled to the resistor 1214 according to one embodiment. In yet another embodiment, the error amplifier 1250 is coupled to the CCFL 1208 and the resistor 1209 through the terminal 1252. In yet another embodiment, the error amplifier 1250 and the gate driver 1260 are coupled to the capacitor 1254 through the terminal 1266. In yet another embodiment, the gate driver 1260 is coupled to the power stage 1204 through the terminal 1262.

As an example, the control chip 1202 regulates the start-up, normal operation, and protection of the system 1200. In one embodiment, the control chip 1202 sends a drive signal 1264 to the power stage 1204. In another embodiment, the power stage 1204 also receives a system input voltage ($V_{IN}$) and generates a transformer input voltage, which is received by the transformer 1206. In yet another embodiment, the transformer 1206, together with the capacitor 1207, supplies a lamp voltage to the CCFL 1208. In yet another embodiment, the CCFL 1208 is coupled to the resistor 1209, which converts the current that flows through the CCFL 1208 into a sensing voltage 1258. In yet another embodiment, the sensing voltage 1258 is then received by the error amplifier 1250 through the terminal 1252.

As shown in FIG. 12, the error amplifier 1250 is a part of the control chip 1202, which also includes at least the voltage selector 1220 and the level shifter 1230, according to an embodiment. For example, the level shifter 1230 receives a dimming voltage ($V_{DIM}$) and converts the dimming voltage ($V_{DIM}$) into a shifted voltage ($V_{sft}$). In another example, the dimming voltage can be adjusted and is supplied through the terminal 1222 from one or more components that are external to the control chip 1202. In yet another example, the shifted voltage is inversely proportional to the dimming voltage.

According to another embodiment, the shifted voltage ($V_{sft}$) is outputted to the voltage selector 1220, which also receives a DRC voltage ($V_{DRC}$). For example, the DRC voltage can be adjusted and is supplied through the terminal 1224 by one or more components external to the control chip 1202. In another example, the voltage selector 1220 compares $V_{DRC}$ and $V_{sft}$, and uses the higher of the these two voltages as its output voltage 1242 ($V_{ref}$). In one embodiment, the output voltage 1242 is received by the error amplifier 1250. In another embodiment, the error amplifier 1250 processes the received output voltage 1242 and the received sensing voltage 1258, and outputs a CMP signal 1256 with the capacitor 1254. In yet another embodiment, the CMP signal 1256 is sent to the gate driver 1260.

According to yet another embodiment, the DRC voltage ($V_{DRC}$) is also received by the low brightness detector 1244. For example, the low brightness detector 1244 processes the DRC signal and outputs a brightness signal 1246 to the open-loop detector 1280. In another example, the brightness signal 1246 indicates whether the brightness of the CCFL 1208 would be above a predetermined brightness threshold.

As shown in FIG. 12, the control chip 1202 also includes the logic component 1270, the open-loop detector 1280, and the protection component 1290 according to one embodiment. For example, the logic component 1270 outputs an ENA signal 1272 to the open-loop detector 1280. In another example, the open-loop detector 1280 also receives the brightness signal 1246 and the sensing voltage 1258.

According to one embodiment, if the open-loop detector 1280 is enabled by both the brightness signal 1246 and the ENA signal 1272, the open-loop detector 1280 processes the sensing voltage 1258, determines whether the CCFL 1208 has an open circuit, and sends an OLP signal 1282 to the protection component 1290. In response, the protection component 1290 outputs a signal 1292 to the gate driver 1260.

According to another embodiment, the gate driver 1260 processes the received signals 1256 and 1292 and sends the drive signal 1264 through the terminal 1262 to the power stage 1204. For example, if the OLP signal 1282 indicates that the CCFL 1208 has been determined to have an open circuit, the drive signal 1264 would remain at the logic low level. In another example, if the open-loop detector 1280 is not enabled by both the brightness signal 1246 and the ENA signal 1272, the drive signal 1264 is not affected by the signal 1292. According to one embodiment, the drive signal 1264 is generated based on the CMP signal 756, not the signal 792, if at least one of the brightness signal 1246 and the ENA signal 1272 is at the logic low level.

Also as shown in FIG. 12, the control chip 1202 also includes the voltage generator 1210 according to an embodiment. For example, the voltage generator 1210 provides a reference voltage to the resistor 1214 through the terminal 1212.

Figure 13:
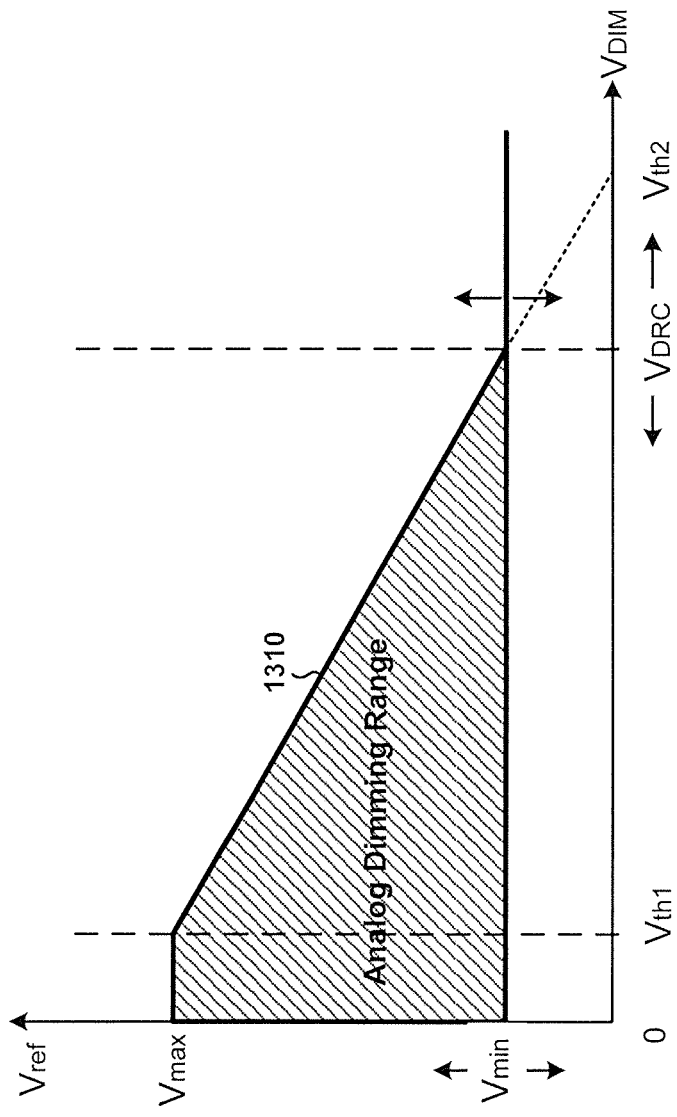
FIG. 13 is a simplified diagram showing the output voltage of the voltage selector as a function of the dimming voltage for the system for controlling brightness of one or more CCFLs according to one embodiment of the present invention.

FIG. 13 is a simplified diagram showing the output voltage 1242 of the voltage selector 1220 as a function of the dimming voltage for the system 1200 for controlling brightness of one or more CCFLs according to one embodiment of the present invention. This diagram is merely an example, which should not unduly limit the scope of the claims. One of ordinary skill in the art would recognize many variations, alternatives, and modifications.

For example, if the dimming voltage is smaller than a first threshold level ($V_{th1}$) but larger than or equal to zero, the output voltage 1242 remains at a maximum voltage level ($V_{max}$). In another example, if the dimming voltage is equal to or larger than the first threshold level ($V_{th1}$) but smaller than or equal to the DRC voltage, the output voltage 1242 decreases with the increasing $V_{DIM}$, along a straight line 1310.

In one embodiment, if the dimming voltage is equal to the DRC voltage, the output voltage 1242 is equal to a minimum voltage level ($V_{min}$). In another embodiment, if the dimming voltage is larger than the DRC voltage, the output voltage 442 remains at the minimum level ($V_{min}$).

For example, the DRC voltage can be varied from the first threshold level ($V_{th1}$) to the second threshold level ($V_{th2}$). As shown in FIG. 13, the second threshold level ($V_{th2}$) corresponds to the intersection between the horizontal axis for $V_{DIM}$ and the extension of the straight line 1310. In another example, the minimum level ($V_{min}$) decreases with the increasing DRC voltage, along the straight line 1310 and/or its extension. In one embodiment, the minimum level ($V_{min}$) can be varied from $V_{max}$ to zero.

Figure 14:
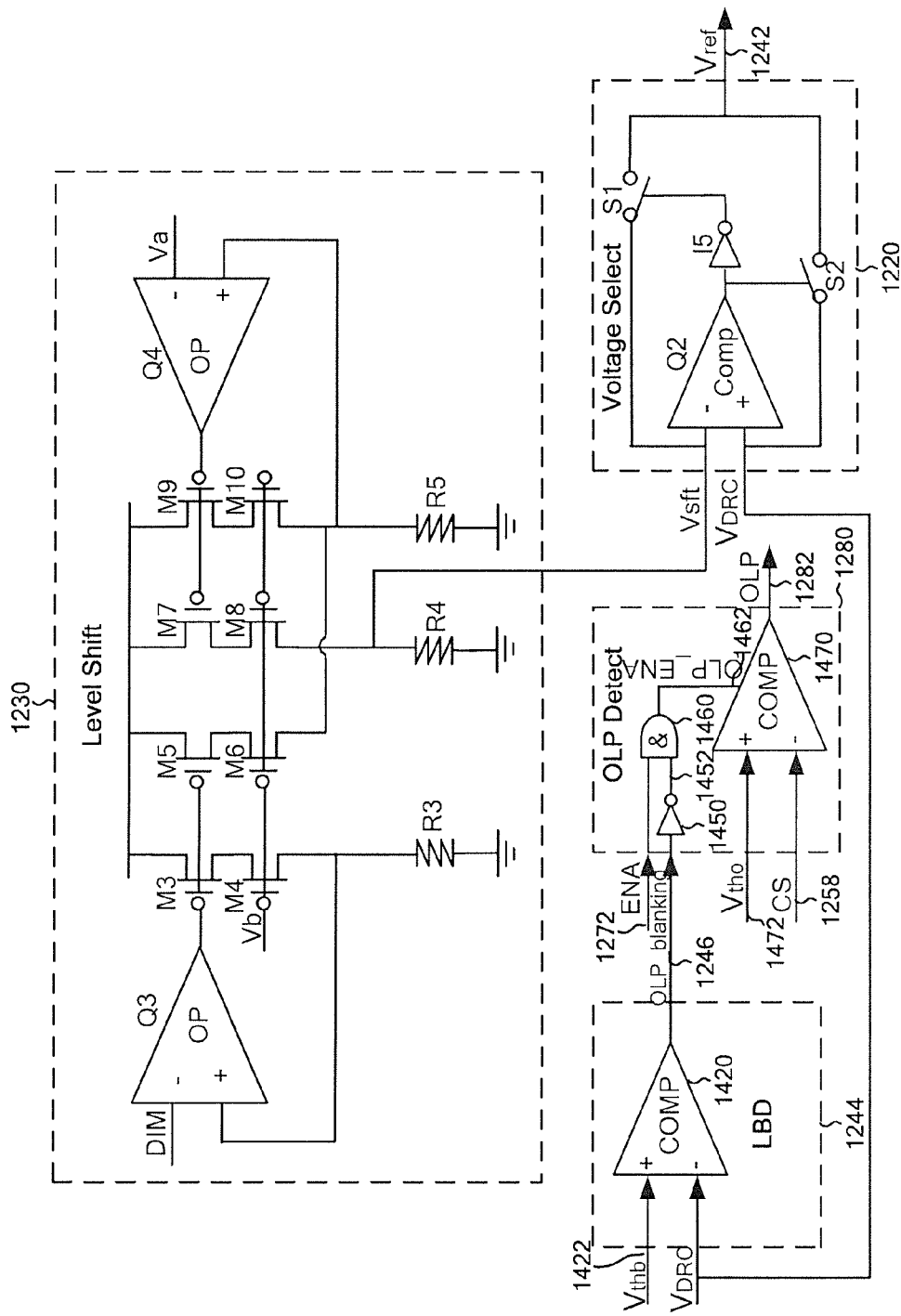
FIG. 14 is a simplified diagram showing a combination of the voltage selector, the level shifter, the low brightness detector, and the open-loop detector as part of the system for controlling brightness of one or more CCFLs according to one embodiment of the present invention.

FIG. 14 is a simplified diagram showing a combination of the voltage selector 1220, the level shifter 1230, the low brightness detector 1244, and the open-loop detector 1280 as part of the system 1200 for controlling brightness of one or more CCFLs according to one embodiment of the present invention. This diagram is merely an example, which should not unduly limit the scope of the claims. One of ordinary skill in the art would recognize many variations, alternatives, and modifications.

As shown in FIG. 14, the low brightness detector 1244, for example, includes a comparator 1420. In one embodiment, the comparator 1420 receives a threshold voltage 1422 ($V_{thb}$) and the DRC voltage and outputs the brightness signal 1246 to the open-loop detector 1280. For example, the threshold voltage 1422 ($V_{thb}$) corresponds to the predetermined brightness threshold. In another example, if the threshold voltage 1422 is higher than the DRC voltage, the brightness signal 1246 is at the logic high level. In yet another example, if the threshold voltage 1422 is lower than the DRC voltage, the brightness signal 1246 is at the logic low level.

According to one embodiment, the open-loop detector 1280 includes a NOT gate 1450, an AND gate 1460, and a comparator 1470. For example, the NOT gate 1450 receives the brightness signal 1246 and generates a signal 1452. In another example, the signal 1452 is at the logic high level if the threshold voltage 1422 is lower than the DRC voltage. In yet another example, the signal 1452 is at the logic low level if the threshold voltage 1422 is higher than the DRC voltage.

According to another embodiment, the signal 1452 is received by the AND gate 1460, which also receives the ENA signal 1272 and outputs a signal 1462. For example, the signal 1462 is received by the comparator 1470 as an enabling signal. In another example, the comparator 1470 also receives the sensing voltage 1258 and a threshold voltage 1472 ($V_{tho}$), and outputs the OLP signal 1282. In one embodiment, if the signal 1462 is at the logic low level, the OLP signal 1282 remains at the logic low level. In another embodiment, if the signal 1462 is at the logic high level, the OLP signal 1282 is at the logic high level if the threshold voltage 1472 is higher than the sensing voltage 1258 and the OLP signal 1282 is at the logic low level if the threshold voltage 1472 is lower than the sensing voltage 1258. In yet another embodiment, if the sensing voltage 1258 is below the threshold voltage 1472, the CCFL 1208 is determined to have an open circuit.

As discussed above and further emphasized here, FIGS. 12 and 13 are merely examples, which should not unduly limit the scope of the claims. One of ordinary skill in the art would recognize many variations, alternatives, and modifications. For example, the resistor 1214 is replaced by a voltage divider that can provide the DRC voltage ($V_{DRC}$) to the voltage selector 1220 and the low brightness detector 1244.

Figure 15:
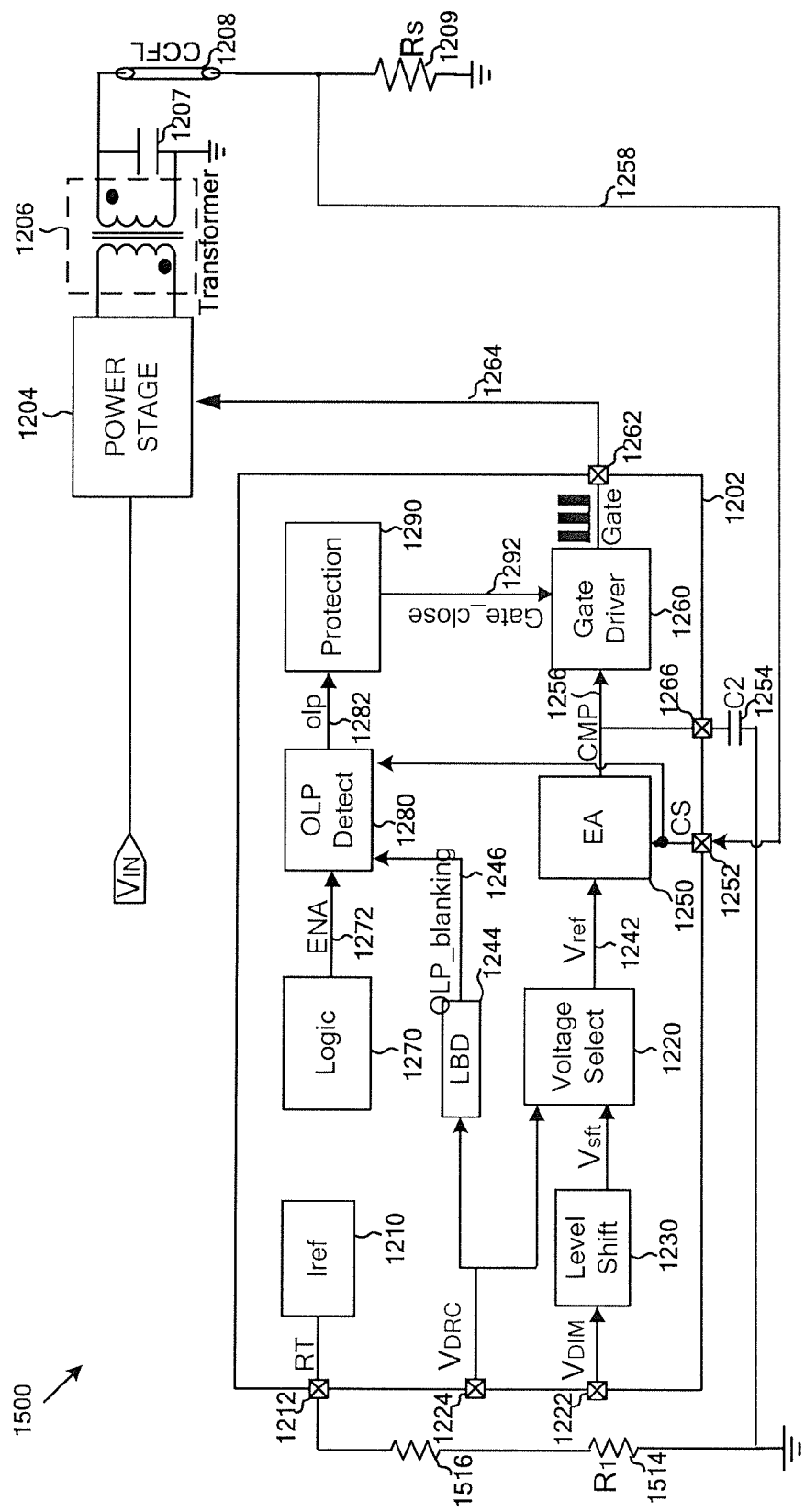
FIG. 15 is a simplified diagram showing a system for controlling brightness of one or more CCFLs according to yet another embodiment of the present invention.

FIG. 15 is a simplified diagram showing a system for controlling brightness of one or more CCFLs according to yet another embodiment of the present invention. This diagram is merely an example, which should not unduly limit the scope of the claims. One of ordinary skill in the art would recognize many variations, alternatives, and modifications.

As shown in FIG. 15, the system 1500 includes the control chip 1202, the power stage 1204, the transformer 1206, the CCFL 1208, the resistor 1209, the capacitors 1207 and 1254, and resistors 1514 and 1516. For example, the control chip 1202 includes the voltage generator 1210, the voltage selector 1220, the level shifter 1230, the low brightness detector 1244, the error amplifier 1250, the gate driver 1260, the logic component 1270, the open-loop detector 1280, and the protection component 1290. In another example, the control chip 1202 also includes terminals 1212, 1222, 1224, 1252, 1262, and 1266.

In one embodiment, through the terminal 1212, the voltage generator 1210 is coupled to the resistor 1516, which is connected to the resistor 1514. For example, the resistors 1514 and 1516 form a voltage divider, which provides the DRC voltage ($V_{DRC}$) to the voltage selector 1220 and the low brightness detector 1244. In another example, the DRC voltage ($V_{DRC}$) can be adjusted by changing the resistors 1514 and 1516.

In another embodiment, the minimum level ($D_{min}$) for the duty cycle of the burst signal 742 is determined as follows:

$$\frac{V_{min}}{V_{max}} = j \times \frac{R_4}{R_3 + R_4} \quad (2)$$

where $R_3$ is the resistance value of the resistor 1514, and $R_4$ is the resistance value of the resistor 1516. j is a constant that is independent of $R_3$ and $R_4$. As shown by Equation 2, the minimum of the brightness for the CCFL 1208 can be adjusted by changing the resistance values of resistors 1514 and 1516, if the maximum of the brightness for the CCFL 1208 remains constant.

As discussed above and further emphasized here, FIGS. 7, 11, 12, and 15 are merely examples, which should not unduly limit the scope of the claims. One of ordinary skill in the art would recognize many variations, alternatives, and modifications. For example, the CCFL 708 is replaced by multiple CCFLs. In another example, the CCFL 1208 is replaced by multiple CCFLs.

According to another embodiment, a system for adjusting brightness of one or more cold-cathode fluorescent lamps includes a voltage selector configured to receive a dimming voltage and a first threshold voltage and generate an output voltage. The output voltage is selected from a group consisting of the dimming voltage and the first threshold voltage. Additionally, the system includes an oscillator coupled to a first capacitor and configured to generate a ramp signal with the first capacitor, and a signal generator configured to receive the ramp signal and the output voltage and generate a first signal. The first signal corresponds to a lamp brightness level. Moreover, the system includes a brightness detector configured to receive the first signal and output a second signal. The second signal indicates whether the lamp brightness level is higher than a threshold brightness level. Also, the system includes a logic component configured to output a third signal, an open-loop detector configured to receive at least the second signal and the third signal and generate a fourth signal in response to at least the second signal and the third signal, and a protection component configured to receive the fourth signal and generate a protection signal based on at least information associated with the fourth signal. Additionally, the system includes an error amplifier coupled to a second capacitor and configured to receive the first signal and a sensing voltage and to generate a fifth signal based on at least information associated with the first signal and the sensing voltage, and a gate driver configured to receive the protection signal and the fifth signal and generate a drive signal. For example, the open-loop detector is further configured to receive the sensing voltage, the sensing voltage being associated with a lamp current flowing through at least one cold-cathode fluorescent lamp, and process information associated with the second signal and the third signal. In another example, the open-loop detector is further configured to, if the second signal satisfies one or more predetermined first conditions and the third signal satisfies one or more predetermined second conditions, determine whether the cold-cathode fluorescent lamp is associated with an open circuit based on at least information associated with the sensing voltage and output the fourth signal indicating whether the cold-cathode fluorescent lamp is associated with the open circuit. In yet another example, the open-loop detector is further configured to, if the second signal does not satisfy the one or more predetermined first conditions, output the fourth signal regardless of the sensing voltage, the fourth signal indicating that the cold-cathode fluorescent lamp is not associated with the open circuit. In yet another example, the open-loop detector is further configured to, if the third signal does not satisfy the one or more predetermined second conditions, output the fourth signal regardless of the sensing voltage, the fourth signal indicating that the cold-cathode fluorescent lamp is not associated with the open circuit. For example, the system is implemented according to FIG. 7, FIG. 8, FIG. 9, FIG. 10, and/or FIG. 11.

In another example, the open-loop detector is further configured to, if the second signal indicates that the lamp brightness level is higher than the threshold brightness level and the third signal satisfies the one or more predetermined second conditions, determine whether the cold-cathode fluorescent lamp is associated with the open circuit based on at least information associated with the sensing voltage and output the fourth signal indicating whether the cold-cathode fluorescent lamp is associated with the open circuit. In yet another example, the open-loop detector is further configured to, if the second signal indicates that the lamp brightness level is not higher than the threshold brightness level, output the fourth signal indicating that the cold-cathode fluorescent lamp is not associated with the open circuit.

In yet another example, the first signal is associated with one or more first pulses, each of the one or more first pulses corresponding to a first pulse width. In yet another example, the brightness detector is further configured to process information associated with the first signal, and generate a counter signal based on at least information associated with the first signal, the counter signal including one or more second pulses, each of the one or more second pulses corresponding to a threshold pulse width. In yet another example, the brightness detector is further configured to process information associated with the first pulse width and the threshold pulse width, and output the second signal based on at least information associated with the first pulse width and the threshold pulse width.

In yet another example, the brightness detector is further configured to determine whether the first pulse width is larger than the threshold pulse width, the threshold pulse width corresponding to the threshold brightness level. In yet another example, the brightness detector is further configured to, if the first pulse width is determined to be larger than the threshold pulse width, output the second signal indicating that the lamp brightness level is higher than the threshold brightness level.

In yet another example, the brightness detector includes a pulse generator configured to receive the first signal and generate a trigger signal, a counter component configured to receive the trigger signal and generate a counter signal, and a flip-flop component configured to receive the counter signal and the first signal and generate an output signal. In yet another example, the brightness detector further includes a NOT gate configured to receive the output signal and generate the second signal, and if the second signal is at a logic low level, the second signal indicates the lamp brightness level is higher than the threshold brightness level.

In yet another example, the open-loop detector includes a NOT gate configured to receive the second signal and generates a sixth signal, an AND gate configured to receive the sixth signal and the third signal and generate a seventh signal, and a comparator configured to receive the seventh signal, the sensing voltage, and a second threshold voltage and generate the fourth signal. In yet another example, the comparator is configured to, if the seventh signal is at a logic high level, generate the fourth signal at a logic low level regardless of the sensing voltage and the second threshold voltage. In yet another example, the comparator is further configured to, if the seventh signal is at a logic high level, generate the fourth signal at a logic low level if the sensing voltage is higher than the second threshold voltage, and generate the fourth signal at a logic high level if the sensing voltage is lower than the second threshold voltage. In yet another example, if the fourth signal is at the logic low level, the fourth signal indicates that the cold-cathode fluorescent lamp is not associated with the open circuit, and if the fourth signal is at the logic high level, the fourth signal indicates that the cold-cathode fluorescent lamp is associated with the open circuit.

In yet another example, the voltage selector is further configured to select the dimming voltage as the output voltage if the dimming voltage is higher than the first threshold voltage, and select the first threshold voltage as the output voltage if the dimming voltage is lower than the first threshold voltage. In yet another example, the voltage selector, the oscillator, the signal generator, the brightness detector, the logic component, the open-loop detector, the protection component, the error amplifier, and the gate driver are all located on a chip. In yet another example, the system for adjusting brightness of one or more cold-cathode fluorescent lamps further includes a voltage generator located on the chip, the chip including at least a first terminal and a second terminal. In yet another example, the voltage generator is configured to output a reference voltage to a voltage divider through the first terminal, the voltage divider being located outside the chip. In yet another example, the voltage divider is configured to output the first threshold voltage to the voltage selector through the second terminal. In yet another example, the protection component and the gate driver are further configured, if the fourth signal indicates that the cold-cathode fluorescent lamp is associated with the open circuit, generate the drive signal at a logic low level regardless of the fifth signal.

According to yet another embodiment, a method for adjusting brightness of one or more cold-cathode fluorescent lamps includes receiving a dimming voltage and a first threshold voltage. The dimming voltage is associated with a first magnitude, and the first threshold voltage is associated with a second magnitude. Additionally, the method includes generating an output voltage, the output voltage being selected from a group consisting of the dimming voltage and the first threshold voltage. Moreover, the method includes receiving the output voltage and a ramp signal, processing information associated with the output voltage and the ramp signal, and generating a first signal based on at least information associated with the output voltage and the ramp signal. The first signal corresponds to a lamp brightness level. Also, the method includes processing information associated with the first signal, and outputting a second signal based on at least information associated with the first signal. The second signal indicates whether the lamp brightness level is higher than a threshold brightness level. Additionally, the method includes receiving the second signal, a third signal, and a sensing voltage. The sensing voltage is associated with a lamp current flowing through at least one cold-cathode fluorescent lamp. Moreover, the method includes generating a fourth signal in response to at least the second signal and the third signal, receiving the first signal and the sensing voltage, generating a fifth signal based on at least information associated with the first signal and the sensing voltage, processing information associated with the fourth signal and the fifth signal, and generating a drive signal based on at least information associated with the fourth signal and the fifth signal. For example, the process for generating a fourth signal in response to at least the second signal and the third signal includes processing information associated with the second signal and the third signal. In another example, the process for generating a fourth signal in response to at least the second signal and the third signal includes, if the second signal satisfies one or more predetermined first conditions and the third signal satisfies one or more predetermined second conditions, determining whether the cold-cathode fluorescent lamp is associated with an open circuit based on at least information associated with the sensing voltage, and outputting the fourth signal indicating whether the cold-cathode fluorescent lamp is associated with the open circuit. In yet another example, the process for generating a fourth signal in response to at least the second signal and the third signal includes, if the second signal does not satisfy the one or more predetermined first conditions, outputting the fourth signal regardless of the sensing voltage, the fourth signal indicating that the cold-cathode fluorescent lamp is not associated with the open circuit. In yet another example, the process for generating a fourth signal in response to at least the second signal and the third signal includes, if the third signal does not satisfy the one or more predetermined second conditions, outputting the fourth signal regardless of the sensing voltage, the fourth signal indicating the cold-cathode fluorescent lamp is not associated with the open circuit. For example, the method is implemented according to FIG. 7, FIG. 8, FIG. 9, FIG. 10, and/or FIG. 11. In another example, the method further includes adjusting the first magnitude associated with the dimming voltage. In yet another example, the method further includes adjusting the second magnitude associated with the first threshold voltage.

According to yet another embodiment, a system for adjusting brightness of one or more cold-cathode fluorescent lamps includes a level shifter configured to receive a dimming voltage and generate a first output voltage based on at least information associated with the dimming voltage, and a voltage selector configured to receive the first output voltage and a first threshold voltage and generate a second output voltage. The second output voltage is selected from a group consisting of the first output voltage and the first threshold voltage, and the first threshold voltage corresponds to a lamp brightness level. Additionally, the system includes a brightness detector configured to receive the first threshold voltage and output a first signal, and the first signal indicates whether the lamp brightness level is higher than a threshold brightness level. Moreover, the system includes a logic component configured to output a second signal, and an open-loop detector configured to receive at least the first signal and the second signal and generate a third signal in response to at least the first signal and the second signal. Also, the system includes a protection component configured to receive the third signal and generate a protection signal based on at least information associated with the third signal, and an error amplifier coupled to a capacitor and configured to receive the second output voltage and a sensing voltage and to generate a fourth signal based on at least information associated with the second output voltage and the sensing voltage. Additionally, the system includes a gate driver configured to receive the protection signal and the fourth signal and generate a drive signal. For example, the open-loop detector is further configured to receive the sensing voltage, the sensing voltage being associated with a lamp current flowing through at least one cold-cathode fluorescent lamp, and process information associated with the first signal and the second signal. In another example, the open-loop detector is further configured to, if the first signal satisfies one or more predetermined first conditions and the second signal satisfies one or more predetermined second conditions, determine whether the cold-cathode fluorescent lamp is associated with an open circuit based on at least information associated with the sensing voltage and output the third signal indicating whether the cold-cathode fluorescent lamp is associated with the open circuit. In yet another example, the open-loop detector is further configured to, if the first signal does not satisfy the one or more predetermined first conditions, output the third signal regardless of the sensing voltage, the third signal indicating that the cold-cathode fluorescent lamp is not associated with the open circuit. In yet another example, the open-loop detector is further configured to, if the second signal does not satisfy the one or more predetermined second conditions, output the third signal regardless of the sensing voltage, the third signal indicating that the cold-cathode fluorescent lamp is not associated with the open circuit. For example, the system is implemented according to FIG. 12, FIG. 13, FIG. 14, and/or FIG. 15.

In another example, the open-loop detector is further configured to, if the first signal indicates that the lamp brightness level is higher than the threshold brightness level and the second signal satisfies the one or more predetermined second conditions, determine whether the cold-cathode fluorescent lamp is associated with the open circuit based on at least information associated with the sensing voltage and output the third signal indicating whether the cold-cathode fluorescent lamp is associated with the open circuit. In yet another example, the open-loop detector is further configured to, if the first signal indicates that the lamp brightness level is not higher than the threshold brightness level, output the third signal indicating that the cold-cathode fluorescent lamp is not associated with the open circuit.

In yet another example, the brightness detector includes a comparator, and the comparator is configured to receive the first threshold voltage and a second threshold voltage and output the first signal based on at least information associated with the first threshold voltage and the second threshold voltage, the second threshold voltage corresponding to the threshold brightness level. In yet another example, if the first signal is at a logic low level, the first signal indicates the lamp brightness level is higher than the threshold brightness level.

In yet another example, the level shifter, the voltage selector, the brightness detector, the logic component, the open-loop detector, the protection component, the error amplifier, the gate driver are all located on a chip. In yet another example, the system further includes a voltage generator located on the chip, the chip including at least a first terminal and a second terminal. In yet another example, the voltage generator is configured to output a reference voltage to a voltage divider through the first terminal, the voltage divider being located outside the chip. In yet another example, the voltage divider is configured to output the first threshold voltage to the voltage selector through the second terminal.

According to yet another embodiment, a method for adjusting brightness of one or more cold-cathode fluorescent lamps includes receiving a dimming voltage. The dimming voltage is associated with a first magnitude. Additionally, the method includes generating a first output voltage based on at least information associated with the dimming voltage, and receiving the first output voltage and a first threshold voltage. The first threshold voltage corresponds to a lamp brightness level and is associated with a second magnitude. Moreover, the method includes generating a second output voltage, the second output voltage being selected from a group consisting of the first output voltage and the first threshold voltage. Also, the method includes processing information associated with the first threshold voltage, and outputting a first signal based on at least information associated with the first threshold voltage. The first signal indicates whether the lamp brightness level is higher than a threshold brightness level. Additionally, the method includes receiving the first signal, a second signal, and a sensing voltage. The sensing voltage is associated with a lamp current flowing through at least one cold-cathode fluorescent lamp. Moreover, the method includes generating a third signal in response to at least the first signal and the second signal, receiving the second output voltage and a sensing voltage, generating a fourth signal based on at least information associated with the second output voltage and the sensing voltage, processing information associated with the third signal and the fourth signal, and generating a drive signal based on at least information associated with the third signal and the fourth signal. For example, the process for generating a third signal in response to at least the first signal and the second signal includes processing information associated with the first signal and the second signal. In another example, the process for generating a third signal in response to at least the first signal and the second signal includes, if the first signal satisfies one or more predetermined first conditions and the second signal satisfies one or more predetermined second conditions, determining whether the cold-cathode fluorescent lamp is associated with an open circuit based on at least information associated with the sensing voltage, and outputting the third signal indicating whether the cold-cathode fluorescent lamp is associated with the open circuit. In yet another example, the process for generating a third signal in response to at least the first signal and the second signal includes, if the first signal does not satisfy the one or more predetermined first conditions, outputting the third signal regardless of the sensing voltage, the third signal indicating that the cold-cathode fluorescent lamp is not associated with the open circuit. In yet another example, the process for generating a third signal in response to at least the first signal and the second signal includes, if the second signal does not satisfy the one or more predetermined second conditions, outputting the third signal regardless of the sensing voltage, the third signal indicating that the cold-cathode fluorescent lamp is not associated with the open circuit. For example, the method is implemented according to FIG. 12, FIG. 13, FIG. 14, and/or FIG. 15. In another example, the method further includes adjusting the first magnitude associated with the dimming voltage. In yet another example, the method further includes adjusting the second magnitude associated with the first threshold voltage.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for adjusting brightness of one or more cold-cathode fluorescent lamps, the system comprising:
   a voltage selector configured to receive a dimming voltage and a first threshold voltage and generate an output voltage, the output voltage being selected from a group consisting of the dimming voltage and the first threshold voltage;
   an oscillator coupled to a first capacitor and configured to generate a ramp signal with the first capacitor;
   a signal generator configured to receive the ramp signal and the output voltage and generate a first signal, the first signal corresponding to a lamp brightness level;
   a brightness detector configured to receive the first signal and output a second signal, the second signal indicating whether the lamp brightness level is higher than a threshold brightness level;
   a logic component configured to output a third signal;
   an open-loop detector configured to receive at least the second signal and the third signal and generate a fourth signal in response to at least the second signal and the third signal;
   a protection component configured to receive the fourth signal and generate a protection signal based on at least information associated with the fourth signal;
   an error amplifier coupled to a second capacitor and configured to receive the first signal and a sensing voltage and to generate a fifth signal based on at least information associated with the first signal and the sensing voltage; and
   a gate driver configured to receive the protection signal and the fifth signal and generate a drive signal;
   wherein the open-loop detector is further configured to:
      receive the sensing voltage, the sensing voltage being associated with a lamp current flowing through at least one cold-cathode fluorescent lamp;
      process information associated with the second signal and the third signal;
      if the second signal satisfies one or more predetermined first conditions and the third signal satisfies one or more predetermined second conditions, determine whether the cold-cathode fluorescent lamp is associated with an open circuit based on at least information associated with the sensing voltage and output the fourth signal indicating whether the cold-cathode fluorescent lamp is associated with the open circuit;
      if the second signal does not satisfy the one or more predetermined first conditions, output the fourth signal regardless of the sensing voltage, the fourth signal indicating that the cold-cathode fluorescent lamp is not associated with the open circuit; and
      if the third signal does not satisfy the one or more predetermined second conditions, output the fourth signal regardless of the sensing voltage, the fourth signal indicating that the cold-cathode fluorescent lamp is not associated with the open circuit;
   wherein the brightness detector includes:
      a pulse generator configured to receive the first signal and generate a trigger signal;
      a counter component configured to receive the trigger signal and generate a counter signal; and
      a flip-flop component configured to receive the counter signal and the first signal and generate an output signal.

2. The system of claim 1 wherein the open-loop detector is further configured to:
   if the second signal indicates that the lamp brightness level is higher than the threshold brightness level and the third signal satisfies the one or more predetermined second conditions, determine whether the cold-cathode fluorescent lamp is associated with the open circuit based on at least information associated with the sensing voltage and output the fourth signal indicating whether the cold-cathode fluorescent lamp is associated with the open circuit; and
   if the second signal indicates that the lamp brightness level is not higher than the threshold brightness level, output the fourth signal indicating that the cold-cathode fluorescent lamp is not associated with the open circuit.

3. The system of claim 1 wherein the first signal is associated with one or more first pulses, each of the one or more first pulses corresponding to a first pulse width.

4. The system of claim 3 wherein the brightness detector is further configured to:
   process information associated with the first signal;
   generate the counter signal based on at least information associated with the first signal, the counter signal including one or more second pulses, each of the one or more second pulses corresponding to a threshold pulse width;
   process information associated with the first pulse width and the threshold pulse width; and
   output the second signal based on at least information associated with the first pulse width and the threshold pulse width.

5. The system of claim 4 wherein the brightness detector is further configured to:
   determine whether the first pulse width is larger than the threshold pulse width, the threshold pulse width corresponding to the threshold brightness level; and
   if the first pulse width is determined to be larger than the threshold pulse width, output the second signal indicating that the lamp brightness level is higher than the threshold brightness level.

6. The system of claim 1 wherein:
   the brightness detector further includes a NOT gate configured to receive the output signal and generate the second signal; and
   if the second signal is at a logic low level, the second signal indicates the lamp brightness level is higher than the threshold brightness level.

7. The system of claim 1 wherein the open-loop detector includes:
   a NOT gate configured to receive the second signal and generate a sixth signal;
   an AND gate configured to receive the sixth signal and the third signal and generate a seventh signal; and
   a comparator configured to receive the seventh signal, the sensing voltage, and a second threshold voltage and generate the fourth signal.

8. The system of claim 7 wherein the comparator is configured to, if the seventh signal is at a logic high level, generate the fourth signal at a logic low level regardless of the sensing voltage and the second threshold voltage.

9. The system of claim 1 wherein the voltage selector is further configured to:
   select the dimming voltage as the output voltage if the dimming voltage is higher than the first threshold voltage; and
   select the first threshold voltage as the output voltage if the dimming voltage is lower than the first threshold voltage.

10. The system of claim 1 wherein the voltage selector, the oscillator, the signal generator, the brightness detector, the logic component, the open-loop detector, the protection component, the error amplifier, and the gate driver are all located on a chip.

11. The system of claim 10, and further comprising a voltage generator located on the chip, the chip including at least a first terminal and a second terminal.

12. The system of claim 11 wherein the voltage generator is configured to output a reference voltage to a voltage divider through the first terminal, the voltage divider being located outside the chip.

13. The system of claim 12 wherein the voltage divider is configured to output the first threshold voltage to the voltage selector through the second terminal.

14. The system of claim 1 wherein the protection component and the gate driver are further configured, if the fourth signal indicates that the cold-cathode fluorescent lamp is associated with the open circuit, generate the drive signal at a logic low level regardless of the fifth signal.

15. A method for adjusting brightness of one or more cold-cathode fluorescent lamps, the method comprising:
   receiving a dimming voltage and a first threshold voltage, the dimming voltage associated with a first magnitude, the first threshold voltage associated with a second magnitude;
   generating an output voltage, the output voltage being selected from a group consisting of the dimming voltage and the first threshold voltage;
   receiving the output voltage and a ramp signal;
   processing information associated with the output voltage and the ramp signal;
   generating a first signal based on at least information associated with the output voltage and the ramp signal, the first signal corresponding to a lamp brightness level;
   processing information associated with the first signal;
   outputting a second signal based on at least information associated with the first signal, the second signal indicating whether the lamp brightness level is higher than a threshold brightness level;
   receiving the second signal, a third signal, and a sensing voltage, the sensing voltage being associated with a lamp current flowing through at least one cold-cathode fluorescent lamp;
   generating a fourth signal in response to at least the second signal and the third signal;
   receiving the first signal and the sensing voltage;
   generating a fifth signal based on at least information associated with the first signal and the sensing voltage;
   processing information associated with the fourth signal and the fifth signal;
   generating a drive signal based on at least information associated with the fourth signal and the fifth signal;
   wherein the process for generating a fourth signal in response to at least the second signal and the third signal includes:
   processing information associated with the second signal and the third signal;
   if the second signal satisfies one or more predetermined first conditions and the third signal satisfies one or more predetermined second conditions,
      determining whether the cold-cathode fluorescent lamp is associated with an open circuit based on at least information associated with the sensing voltage; and
      outputting the fourth signal indicating whether the cold-cathode fluorescent lamp is associated with the open circuit;
   if the second signal does not satisfy the one or more predetermined first conditions, outputting the fourth signal regardless of the sensing voltage, the fourth signal indicating that the cold-cathode fluorescent lamp is not associated with the open circuit; and
   if the third signal does not satisfy the one or more predetermined second conditions, outputting the fourth signal regardless of the sensing voltage, the fourth signal indicating the cold-cathode fluorescent lamp is not associated with the open circuit;
   wherein the process for processing information associated with the first signal includes:
   receiving the first signal;
   generating a trigger signal based on at least information associated with the first signal;
   receiving the trigger signal;
   generating a counter signal based on at least information associated with the trigger signal;
   receiving the counter signal and the first signal; and
   generating an output signal based on at least information associated with the counter signal and the first signal.

16. The method of claim 15, and further comprising adjusting the first magnitude associated with the dimming voltage.

17. The method of claim 15, and further comprising adjusting the second magnitude associated with the first threshold voltage.

* * * * *